United States Patent
Mulzer et al.

(10) Patent No.: US 11,906,493 B2
(45) Date of Patent: Feb. 20, 2024

(54) GAS SENSORS AND METHODS OF SENSING A GAS-PHASE ANALYTE

(71) Applicants: Rohm and Haas Electronic Materials LLC, Marlborough, MA (US); Rohm and Haas Electronic Materials Korea Ltd., Cheonan (KR)

(72) Inventors: Catherine Mulzer, Grafton, MA (US); Christopher D. Gilmore, Natick, MA (US); Hee Jae Yoon, Seoul (KR); Jaclyn Murphy, Ashland, MA (US); Brian Litchfield, West Boylston, MA (US)

(73) Assignee: Rohm and Haas Electronic Materials LLC, Marlborough, MA (US)

( * ) Notice: Subject to any disclaimer, the term of this patent is extended or adjusted under 35 U.S.C. 154(b) by 533 days.

(21) Appl. No.: 16/908,865

(22) Filed: Jun. 23, 2020

(65) Prior Publication Data
US 2020/0400629 A1    Dec. 24, 2020

Related U.S. Application Data

(60) Provisional application No. 62/865,282, filed on Jun. 23, 2019.

(51) Int. Cl.
*G01N 31/22* (2006.01)
*G01N 21/77* (2006.01)
(Continued)

(52) U.S. Cl.
CPC ............ *G01N 31/223* (2013.01); *C08G 65/34* (2013.01); *G01N 21/3504* (2013.01);
(Continued)

(58) Field of Classification Search
CPC ........... G01N 21/3504; G01N 23/2273; G01N 27/227; G01N 21/65; G01N 31/223;
(Continued)

(56) References Cited

U.S. PATENT DOCUMENTS 4,380,619 A * 4/1983 Reinhardt ............... C07C 45/74
528/229
5,841,021 A * 11/1998 De Castro .......... G01N 27/4162
73/31.02
(Continued)

FOREIGN PATENT DOCUMENTS

KR   10-2005-0095964 A   10/2005

OTHER PUBLICATIONS

Schilling, C. L. et al., Macromolecules 1969, 2, 85-88.*
(Continued)

*Primary Examiner* — Arlen Soderquist
(74) *Attorney, Agent, or Firm* — Jonathan D. Baskin

(57) ABSTRACT

Gas sensors are provided. The gas sensors comprise: a substrate; a plurality of electrodes on the substrate; and a polymeric sensing layer on the substrate for adsorbing a gas-phase analyte. The adsorption of the analyte is effective to change a property of the gas sensor that results in a change in an output signal from the gas sensor. The polymeric sensing layer comprises a polymer chosen from substituted or unsubstituted polyarylenes comprising the reaction product of monomers comprising a first monomer comprising an aromatic acetylene group and a second monomer comprising two or more cyclopentadienone groups, or a cured product of the reaction product. The gas sensors and methods of using such sensors find particular applicability in the sensing of gas-phase organic analytes.

13 Claims, 4 Drawing Sheets

(51) Int. Cl.

| | | |
|---|---|---|
| *G01N 27/22* | (2006.01) | |
| *C08G 65/34* | (2006.01) | |
| *G01N 21/3504* | (2014.01) | |
| *G01N 21/65* | (2006.01) | |
| *G01N 23/2273* | (2018.01) | |
| *G01N 27/12* | (2006.01) | |
| *G01N 29/24* | (2006.01) | |
| *G01N 21/35* | (2014.01) | |

(52) U.S. Cl.
CPC ............. *G01N 21/65* (2013.01); *G01N 21/77* (2013.01); *G01N 23/2273* (2013.01); *G01N 27/12* (2013.01); *G01N 27/227* (2013.01); *G01N 29/2443* (2013.01); *G01N 2021/3595* (2013.01); *G01N 2223/07* (2013.01); *G01N 2291/014* (2013.01); *G01N 2291/021* (2013.01)

(58) Field of Classification Search
CPC .... G01N 27/12; G01N 29/2443; G01N 21/77; G01N 29/022; G01N 29/036; C09D 165/00; C08G 61/12; C08G 65/34
USPC .......................................... 436/139–142, 167
See application file for complete search history.

(56) References Cited

U.S. PATENT DOCUMENTS

| | | | | |
|---|---|---|---|---|
| 6,077,408 | A * | 6/2000 | Miyamoto | C12Q 1/26 204/415 |
| 6,171,867 | B1 * | 1/2001 | Feucht | G01N 29/036 436/127 |
| 6,357,278 | B1 | 3/2002 | Sivavec et al. | |
| 6,593,155 | B2 * | 7/2003 | Mohler | H01L 22/20 430/270.15 |
| 7,301,002 | B1 * | 11/2007 | Cornelius | C08G 61/10 429/188 |
| 10,794,866 | B2 | 10/2020 | Gilmore et al. | |
| 2003/0178607 | A1 * | 9/2003 | Swager | G01N 21/7703 252/582 |
| 2005/0176915 | A1 * | 8/2005 | Cho | C08G 61/125 528/86 |
| 2007/0081921 | A1 * | 4/2007 | Swager | C09K 11/06 422/82.05 |
| 2007/0085447 | A1 * | 4/2007 | Larson | H04B 11/00 310/318 |
| 2008/0085566 | A1 * | 4/2008 | Swager | G01N 33/545 428/407 |
| 2008/0135614 | A1 * | 6/2008 | Werner | G06K 7/10128 235/439 |
| 2009/0264544 | A1 * | 10/2009 | Loy | H01M 8/1048 521/27 |
| 2010/0097048 | A1 * | 4/2010 | Werner | H01Q 17/00 324/76.11 |
| 2013/0228223 | A1 * | 9/2013 | Shiba | H01L 51/42 136/263 |
| 2015/0034880 | A1 * | 2/2015 | Miura | C09J 175/04 525/534 |
| 2015/0038666 | A1 * | 2/2015 | Miyazaki | C08G 61/10 528/125 |
| 2015/0059854 | A1 * | 3/2015 | Shiba | H01L 51/0035 136/263 |
| 2016/0231267 | A1 | 8/2016 | Swager et al. | |
| 2017/0009006 | A1 | 1/2017 | Ding et al. | |
| 2018/0162968 | A1 * | 6/2018 | Kinzie | C08L 45/00 |
| 2018/0162992 | A1 * | 6/2018 | Gilmore | C08G 61/10 |
| 2018/0171069 | A1 * | 6/2018 | Wang | C08G 61/10 |

OTHER PUBLICATIONS

Kumar, U. et al., Macromolecules 1995, 28, 124-130.*
Rusanov, A. L. et al., Macromolecular Symposia 2003, 199, 97-107.*
Wu, J. et al., Macromolecules 2003, 36, 7082-7089.*
Park, S. J. et al., Materials Science and Engineering C 2004, 24, 99-102.*
Rusanov, A. L. et al., Progress in Polymer Science 2006, 31, 749-810.*
Keshtov, M. L. et al., Polymer Science, Series C 2009, 51, 17-25.*
Hibbs, M. R. et al., Macromolecules 2009, 42, 8316-8321.*
Keshtov, M. L. et al., Polymer Science, Series B 2010, 52, 656-661.*
Hou, I. C.-Y. et al., Polymer Journal 2018 50, 3-20.*
Largier, T. et al., Journal of Membrane Science 2019, 572, 320-331.*
Daniel Lubczyk, Scaffold-Optimized Dendrimers for the Detection of the Triacetone Triperoxide Explosive Using Quartz Crystal Microbalances, Chempluschem 2012, 77, 102-105, 2012 Wiley-VCH Verlag Gmbh& Co. KGaA.
Search report for corresponding to Taiwan Application No. TW109119441 dated Nov. 15, 2021.

* cited by examiner

US 11,906,493 B2

GAS SENSORS AND METHODS OF SENSING A GAS-PHASE ANALYTE

FIELD OF THE INVENTION

The invention relates generally to gas sensors for sensing a gas-phase analyte. More specifically, this invention relates to gas sensors that include a polymeric sensing layer, and to methods for sensing an analyte using such sensors. The gas sensors and sensing methods have particular applicability in the sensing of gas-phase analytes such as organic gas-phase analytes.

BACKGROUND OF THE INVENTION

The detection of gas-phase analytes is important for various applications in both industrial and consumer market sectors. Gas sensors have been used, for example, in the detection of toxic and flammable gases and vapors (collectively gases), in the monitoring and control of vacuum deposition processes for coating thickness measurement and in humidity monitoring. Interest in gas sensors has recently expanded to the consumer electronics market, for example, to mobile, Internet of Things (IoT) and wearables applications.

A number of gas sensor platforms exist, for example, acoustic wave, capacitive and conductometric (resistive) gas sensors. Such sensors are described, for example, in G. Korotcenkov, *Handbook of Gas Sensor Materials: Properties, Advantages and Shortcomings for Applications Volume 1: Conventional Approaches, Integrated Analytical Systems*, Springer (2013).

Acoustic wave, or piezoelectric-based, sensors include, for example, bulk acoustic wave (BAW) sensors, such as quartz-crystal microbalance (QCM) and film bulk acoustic resonator (FBAR) sensors, and surface acoustic wave (SAW) sensors. Such sensors typically include a piezoelectric layer in which acoustic waves are generated with an intrinsic acoustic resonant frequency. The piezoelectric material can be coated with a sensing material, such as a polymer, metal, metal oxide, silica or other inorganic composite material, that is sorptive for an analyte of interest. Sensing of the analyte occurs as a result of an alteration in a characteristic of the path traveled by the acoustic waves, leading to a change in wave velocity and resonant frequency. Such alteration is a function of a change in one or more properties of the sensing material, for example, one or more of mass loading, viscosity, viscoelasticity, elastic stiffness, electrical conductivity or permittivity, with mass loading being most typical. For example, with an increase in mass loading from adsorbed analyte, a decreased wave velocity and resonant frequency results as compared with an analyte-free sensing layer. A process of transduction is carried out by which the input (e.g., resonant frequency or wave velocity) is converted to a measurable output, which is typically an electrical signal, by piezoelectric effect.

Capacitive sensors operate based on measured capacitance between two electrodes, with the electrodes often taking the form of an interdigitated pattern. One or both of the electrodes can be coated with a sensing material acting as a dielectric which is sorptive of the analyte of interest. Sorption of such analyte on or in the sensing material provides a change in device capacitance, resulting from a change in dielectric permittivity or thickness of the sensing material.

Conductometric (or resistive) gas sensors typically employ an interdigitated electrode pattern coated with a sensing material, with sorption of the analyte by the sensing material resulting in alteration of electrical conductivity (or resistance) of the device. This can be measured, for example, as a change in current which can be correlated to content of the analyte in the sensing layer.

It is important that sensing materials allow for sorptive interactions between the sensing material and analyte of interest. The rate of sensor response is limited by binding and diffusion of the analyte into the sensor material to trigger the desired transduction. Highly-sorptive sensing materials for an analyte of interest would therefore be desired. Moreover, it has been found that over extended periods of operation, analyte binding can lead to sensor drift and loss of sensing performance through reduced response signal and/or prolonged response time. It would therefore be desirable to have a gas sensor that is stable over time and has a quick response, preferably a near-instantaneous response, even in the presence of a high signal-to-noise ratio.

There is a continuing need for improved gas sensors and methods of sensing a gas-phase analyte which address one or more problems associated with the state of the art.

SUMMARY OF THE INVENTION

In accordance with a first aspect of the invention, gas sensors are provided. The gas sensors comprise: a substrate; a plurality of electrodes on the substrate; and a polymeric sensing layer on the substrate for adsorbing a gas-phase analyte. The adsorption of the analyte is effective to change a property of the gas sensor that results in a change in an output signal from the gas sensor. The polymeric sensing layer comprises a polymer chosen from substituted or unsubstituted polyarylenes comprising the reaction product of monomers comprising a first monomer comprising an aromatic acetylene group and a second monomer comprising two or more cyclopentadienone groups, or a cured product of the reaction product.

In accordance with a further aspect of the invention, methods of sensing a gas-phase analyte are provided. The methods comprise: (a) providing a gas sensor as described herein; and (b) exposing the polymeric sensing layer to an atmosphere comprising a gas-phase analyte. The gas sensors and methods of using such sensors find particular applicability in the sensing of gas-phase analytes such as organic gas-phase analytes.

BRIEF DESCRIPTION OF THE DRAWINGS

The present invention will be described with reference to the following drawings, in which like reference numerals denote like features, and in which.

DETAILED DESCRIPTION OF THE INVENTION

Figure 2:
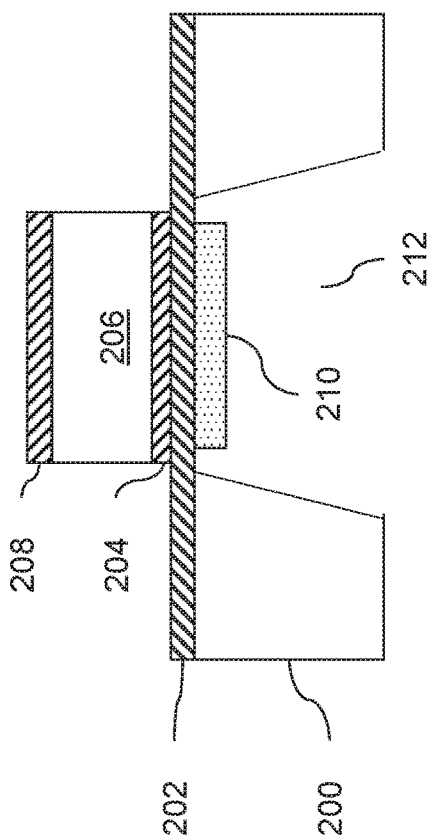
FIG. 2 illustrates in cross-section a film bulk acoustic resonator sensor in accordance with the invention.

Gas sensors of the invention include a substrate, a plurality of electrodes on the substrate, and a polymeric sensing layer on the substrate for adsorbing a gas-phase analyte. Adsorption of the gas-phase analyte is effective to change a property of the gas sensor that results in a change in an output signal from the gas sensor. For example, in the case of an acoustic wave sensor, such as a bulk acoustic wave (BAW) sensor such as quartz crystal microbalance (QCM) and film bulk acoustic resonator sensors, and surface acoustic wave (SAW) sensors, adsorption of the gas-phase analyte on the polymeric sensing layer causes a change in resonant frequency of a piezoelectric transducer circuit. In the case of capacitive sensors, adsorption of the gas-phase analyte on the polymeric sensing layer provides a change in device capacitance, while such adsorption with conductometric gas sensors results in alteration of electrical conductivity (or resistance) of the device. Such changes in measurable property and sensor output signal can be correlated to the content of adsorbed analyte on the polymeric layer.

The polymeric sensing layer comprises a sensing polymer chosen from substituted or unsubstituted polyarylenes comprising the reaction product of monomers comprising a first monomer comprising an aromatic acetylene group and a second monomer comprising two or more cyclopentadienone groups, or a cured product of such reaction product. The first and second monomers can be the same or different, and the first and second monomers can optionally and preferably each include acetylene and cyclopentadienone groups. Suitable polyarylene polymers include, for example, those comprising as polymerized units one or more first monomers chosen from formula (1) or formula (2):

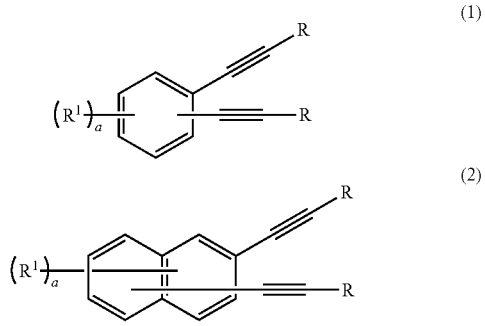

wherein: R is independently chosen from H, —C(=O)OR$^2$, substituted or unsubstituted C$_{6-20}$ aryl, or substituted or unsubstituted C$_{4-20}$ heteroaryl; R$^1$ is independently chosen from F, substituted or unsubstituted C$_{1-10}$ alkyl, such as C$_{1-10}$ fluoroalkyl, C$_{1-10}$ hydroxyalkyl, or C$_{1-10}$ aminoalkyl, substituted or unsubstituted C$_{6-20}$ aryl, C$_{4-20}$ heteroaryl, —C≡C—R, —C(=O)OR$^2$, —C(=O)NHR$^3$, —O—C(=O)R$^4$, —NHC(=O)R$^5$, —S(=O)$_2$—OR$^6$, or S(=O)$_2$—NHR$^3$; R$^2$ is independently chosen from H, substituted or unsubstituted C$_{1-10}$ alkyl, such as C$_{1-10}$ fluoroalkyl, C$_{1-10}$ hydroxyalkyl, or C$_{1-10}$ aminoalkyl, C$_{6-20}$ aryl, or C$_{4-20}$ heteroaryl; R$^3$ is independently chosen from H or substituted or unsubstituted C$_{1-10}$ alkyl; R$^4$ is independently chosen from H or substituted or unsubstituted C$_{1-10}$ alkyl, such as C$_{1-10}$ hydroxyalkyl, —O(C$_{1-10}$ alkyl), or —NH(C$_{1-10}$ alkyl); R$^5$ is independently chosen from H or substituted or unsubstituted C$_{1-10}$ alkyl, such as C$_{1-10}$ hydroxyalkyl, —O(C$_{1-10}$ alkyl), or —NH(C$_{1-10}$ alkyl); R$^6$ is independently chosen from H or substituted or unsubstituted C$_{1-10}$ alkyl; and one or more second monomers comprising two or more cyclopentadienone groups. The aryl groups may include one or more heteroatoms, for example, N, O, or S, with preferable heteroaryl groups including, for example, one or more of furan, pyridine, pyrazine, pyrazole, triazine, oxazole, indole, benzofuran, carbazole, thiophene, quinolone, isoquinoline, or chromene. Typical substituents for aryl groups include, for example, one or more of hydroxy, fluoro, amino, carboxy, thio, or thiocarbonyl. For monomers of formula (1), a is an integer from 0 to 2, and more preferably a is 0 or 1. For monomers of formula (2), a is an integer from 0 to 3, more preferably from 0 to 2, and even more preferably 0 or 1.

Each R is preferably independently chosen from H, C$_{6-20}$ aryl, or C$_{4-20}$ heteroaryl, more preferably from H, C$_{6-10}$ aryl, or C$_{4-10}$ heteroaryl, and yet more preferably from H or phenyl. It is preferred that each R$^1$ is independently chosen from —C(=O)OR$^2$, —C(=O)NHR$^3$, —O—C(=O)R$^4$, —S(=O)$_2$—OR$^6$, and S(=O)$_2$—NHR$^3$ more preferably from —C(=O)OR$^2$ and —C(=O)NHR$^3$, and yet more preferably —C(=O)OR$^2$. Preferably, R$^2$ is H, C$_{1-6}$ alkyl, C$_{1-6}$ hydroxyalkyl, or C$_{1-6}$ aminoalkyl, more preferably H, C$_{1-4}$ alkyl, or C$_{1-6}$ hydroxyalkyl, and even more preferably H. R$^3$ is preferably H or C$_{1-6}$ alkyl, and more preferably H or C$_{1-4}$ alkyl. It is preferred that R$^4$ is C$_{1-6}$ alkyl, C$_{1-6}$ hydroxyalkyl, —O(C$_{1-10}$ alkyl), or —NH(C$_{1-10}$ alkyl), and more preferably C$_{1-6}$ alkyl, C$_{1-6}$ hydroxyalkyl, —O(C$_{1-6}$ alkyl), or —NH(C$_{1-6}$ alkyl). R$^5$ is preferably H, C$_{1-10}$ alkyl, —O(C$_{1-10}$ alkyl), or —NH(C$_{1-10}$ alkyl), and more preferably H, C$_{1-6}$ alkyl, —O(C$_{1-6}$ alkyl), or —NH(C$_{1-6}$ alkyl). R$^6$ is preferably H or C$_{1-6}$ alkyl, more preferably H or C$_{1-4}$ alkyl, and even more preferably H. Any 2 alkynyl moieties in the monomers of formulas (1) and (2) may have an ortho, meta or para relationship to each other, and preferably a meta or para relationship to each other. Preferably, the alkynyl moieties do not have an ortho relationship to each other. Suitable monomers of formulas (1) and (2) are generally commercially available or may be readily prepared by methods known in the art.

The polyarylene polymers may be comprised of one or monomers of formula (1), or one or more monomers of formula (2), or a mixture of one or more monomers of formula (1) and one or more monomers of formula (2). Monomers of formula (1) are preferred first monomers. It is preferred that the polyarylene polymers are comprised of one or more monomers of formula (1) or a mixture of one or more monomers of formula (1) and one or more monomers of formula (2), and more preferably the polyarylene polymers are comprised of one or more monomers of formula (1).

Any monomer containing two or more cyclopentadienone moieties may suitably be used as the second monomer to prepare the present polymers. Alternatively, a mixture of 2 or more different monomers, each having two cyclopentadienone moieties, may be used as the second monomer. Such monomers containing two cyclopentadienone moieties are well-known in the art, such as those described in: U.S. Pat. Nos. 5,965,679; 6,288,188; and 6,646,081; U.S. Application Publication No. 2017-0009006 A1; and Int. Pat. Pubs. WO 97/10193 and WO 2004/073824. It is preferred that the second monomer has the structure shown in formula (3):

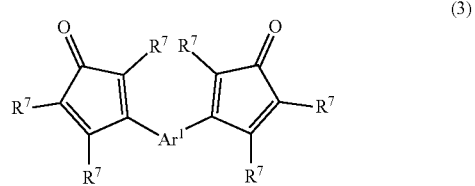

wherein each R⁷ is independently chosen from H, substituted or unsubstituted $C_{1-6}$ alkyl, substituted or unsubstituted $C_{6-20}$ aryl, or substituted or unsubstituted $C_{4-20}$ heteroaryl; and $Ar^1$ is an aromatic moiety. Preferably, each $R^7$ is independently chosen from $C_{3-6}$ alkyl, phenyl, or substituted phenyl, and more preferably each $R^7$ is phenyl.

Particularly preferred for the second monomer are those of formula (3A):

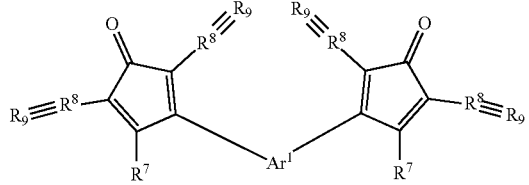

(3A)

wherein each $R^7$ is independently chosen from H, substituted or unsubstituted $C_{1-6}$ alkyl, substituted or unsubstituted $C_{6-20}$ aryl, or substituted or unsubstituted $C_{4-20}$ heteroaryl, preferably $C_{3-6}$ alkyl, substituted or unsubstituted phenyl, and more preferably each $R^7$ is phenyl; $R^8$ is substituted or unsubstituted $C_{6-20}$ aryl, or substituted or unsubstituted $C_{4-20}$ heteroaryl, preferably phenyl; $R^9$ is independently chosen from substituted or unsubstituted $C_{1-6}$ alkyl, substituted or unsubstituted $C_{6-20}$ aryl, or substituted or unsubstituted $C_{4-20}$ heteroaryl, preferably substituted or unsubstituted $C_{6-20}$ aryl, and most preferably phenyl; and $Ar^1$ is an aromatic moiety.

A wide variety of aromatic moieties are suitable for use as $Ar^1$, such as those disclosed in U.S. Pat. No. 5,965,679. Exemplary aromatic moieties useful for $Ar^1$ include those having the structure shown in formula (4):

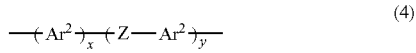

(4)

wherein x is an integer chosen from 1, 2 or 3; y is an integer chosen from 0, 1, or 2; each $Ar^2$ is independently chosen from:

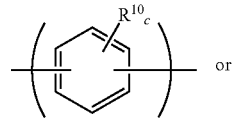

(5)

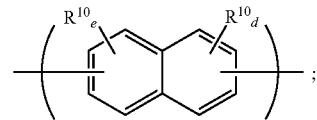

(6)

each $R^{10}$ is independently chosen from halogen, substituted or unsubstituted $C_{1-6}$ alkyl, such as $C_{1-6}$ haloalkyl, $C_{1-6}$ alkoxy, $C_{1-6}$ haloalkoxy, phenyl, and phenoxy; c is an integer from 0 to 4; each of d and e is an integer from 0 to 3; each Z is independently chosen from O, S, $NR^{11}$, $PR^{11}$, $P(=O)$ $R^{11}$, $C(=O)$, $CR^{12}R^{13}$, and $SiR^{12}R^{13}$; $R^{11}$, $R^{12}$, and $R^{13}$ are independently chosen from H, substituted or unsubstituted $C_{1-4}$ alkyl, such as $C_{1-4}$ haloalkyl, and phenyl. It is preferred that x is 1 or 2, and more preferably 1. It is preferred that y is 0 or 1, and more preferably 1. Preferably, each $R^{10}$ is independently chosen from halogen, substituted or unsubstituted $C_{1-4}$ alkyl, such as halo $C_{1-4}$ alkyl, $C_{1-4}$ alkoxy, halo $C_{1-4}$ alkoxy, and phenyl, and more preferably from fluoro, $C_{1-4}$ alkyl, fluoro $C_{1-4}$ alkyl, $C_{1-4}$ alkoxy, fluoro $C_{1-4}$ alkoxy, and phenyl. It is preferred that c is from 0 to 3, more preferably from 0 to 2, and yet more preferably 0 or 1. It is preferred that each of d and e is independently 0 to 2, and more preferably 0 or 1. In formula (6), it is preferred that d+e=0 to 4, and more preferably 0 to 2. Each Z is preferably independently chosen from O, S, $NR^{11}$, $C(=O)$, $CR^{12}R^{13}$, and $SiR^{12}R^{13}$, more preferably from O, S, $C(=O)$, and $CR^{12}R^{13}$, and yet more preferably from O, $C(=O)$, and $CR^{12}R^{13}$. It is preferred that each $R^{11}$, $R^{12}$, and $R^{13}$ are independently chosen from H, $C_{1-4}$ alkyl, fluoro $C_{1-4}$ alkyl, and phenyl; and more preferably from H, $C_{1-4}$ alkyl, fluoro $C_{1-2}$ alkyl, and phenyl. Preferably, each $Ar^2$ has the formula (5).

Suitable exemplary polyarylenes include the following:

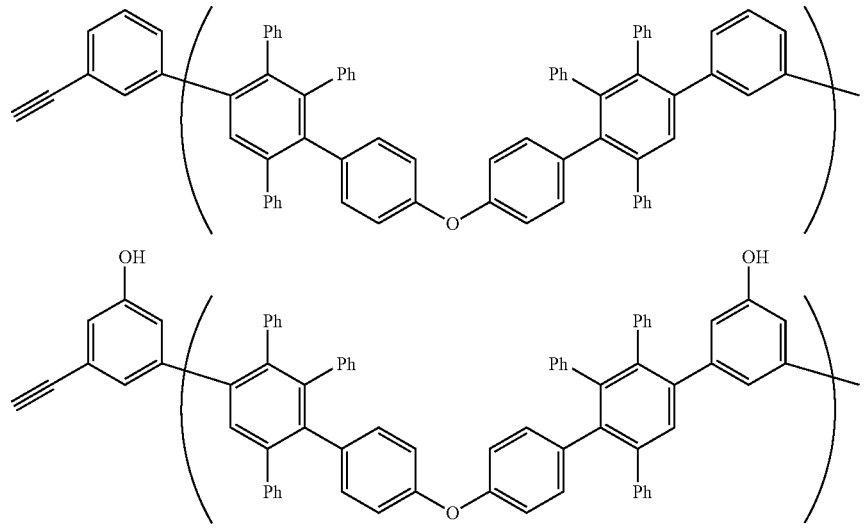

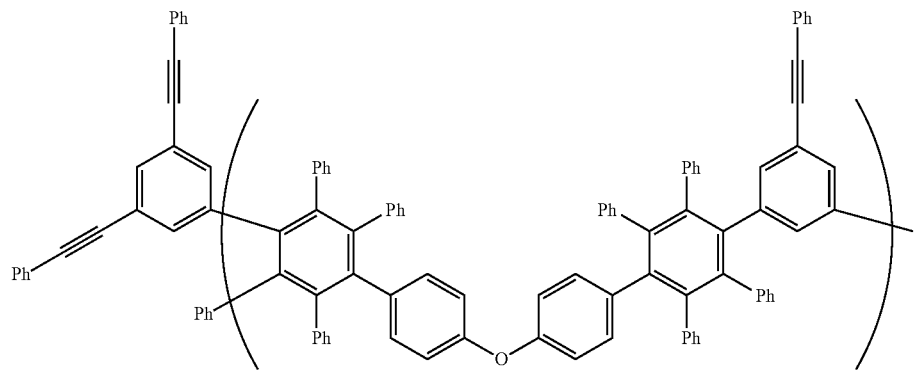
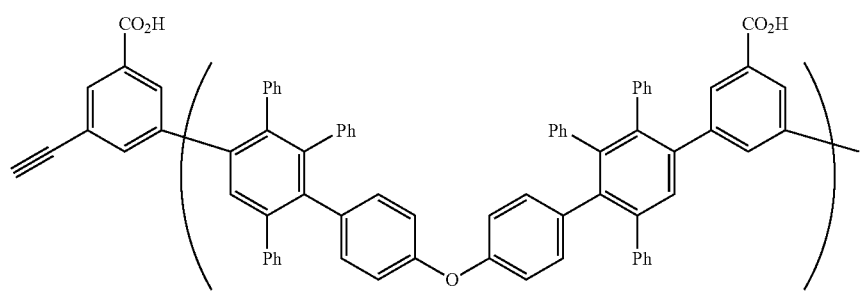
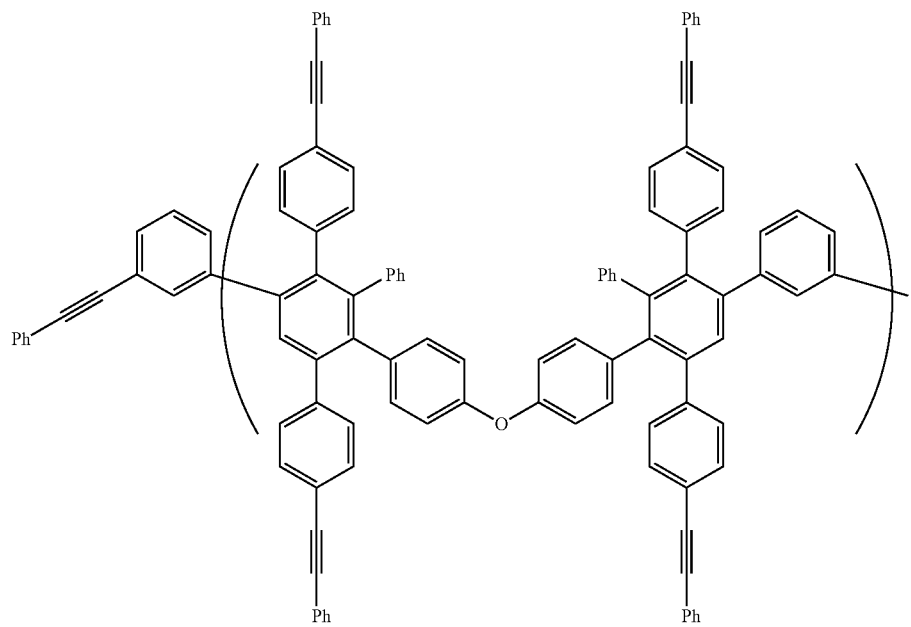

-continued

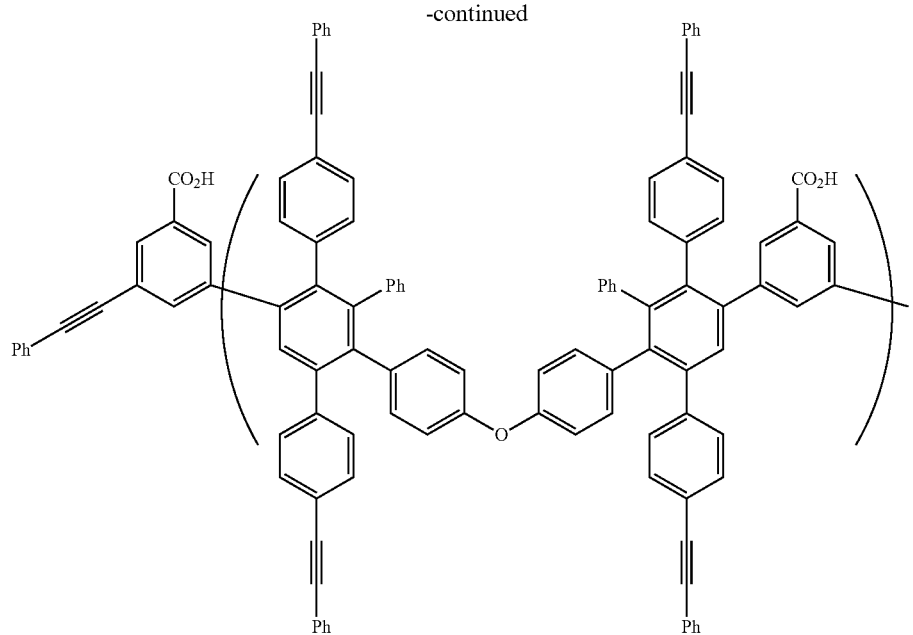

The number of repeat units in the polyarylene polymers is typically from 2 to 100. The polyarylene polymer can take the form of a homopolymer or a copolymer having two, three, or more different types of repeating units. Suitable polyarylene polymers can, for example, comprise one or more of the repeating units represented in the exemplary polyarylene structures. The polyarylene polymers typically have a number average molecular weight Mn of from 1 kDa to 200 kDa, for example, from 3 to 100 or from 4 to 50, determined by GPC using a Polystyrene standard.

As used herein, "substituted" means including at least one substituent such as a halogen, (i.e., F, Cl, Br, I), hydroxyl, amino, thiol, nitrile, nitro, carboxyl, carbonyl, carboxamide, ether, ester, carbonate ester, sulfonyl, sulfinyl, $C_{1-30}$ alkyl, $C_{2-30}$ alkenyl, $C_{7-30}$ aralkyl, $C_{6-30}$ aryl, $C_{4-30}$ heteroaryl, —OR, —$C_{1-30}$ alkylene-OR, or —$C_{1-30}$ alkylidene-OR; wherein R is chosen, for example, from H, $C_{1-30}$ alkyl, $C_{2-30}$ alkenyl, $C_{6-30}$ aryl, or $C_{4-30}$ heteroaryl. Typically, the substituents are chosen, for example, from fluorine, $C_{1-20}$ alkyl, $C_{2-20}$ alkenyl, $C_{7-30}$ aralkyl, $C_{6-20}$ aryl, $C_{4-20}$ heteroaryl, —OR, —$C_{1-20}$ alkylene-OR, or —$C_{1-20}$ alkylidene-OR; and more typically from fluorine, $C_{1-10}$ alkyl, $C_{2-12}$ alkenyl, $C_{7-30}$ aralkyl, $C_{6-20}$ aryl, $C_{4-20}$ heteroaryl, —OR, —$C_{1-20}$ alkylene-OR, or —$C_{1-20}$ alkylidene-OR. R is typically chosen from H, $C_{1-20}$ alkyl, $C_{2-20}$ alkenyl, $C_{6-20}$ aryl, or $C_{4-20}$ heteroaryl, more preferably H, $C_{1-10}$ alkyl, $C_{6-20}$ aryl, or $C_{4-20}$ heteroaryl, and most typically H. It will be understood that any group or structure disclosed with respect to the formulas herein may be so substituted unless otherwise specified, or where such substitution would significantly adversely affect the desired properties of the resulting structure. As used herein, "heteroaryl" refers to an aromatic ring system containing at least one heteroatom selected from nitrogen, oxygen, and sulfur. Preferably, the heteroaryl group is a five or six-membered ring.

When a group containing a specified number of carbon atoms is substituted with another group, the number of carbon atoms in the resulting "substituted" group is the sum of the carbon atoms contained in the original (unsubstituted) group and the carbon atoms (if any) contained in the substituent. For example, for a $C_1$-$C_{20}$ alkyl group substituted with $C_6$-$C_{30}$ aryl group, the total number of carbon atoms in the resulting aryl substituted alkyl group is $C_7$-$C_{50}$.

The polyarylene sensing polymers can readily be made by persons skilled in the art. The polymeric sensing layer is formed from a sensing polymer composition that comprises the sensing polymer and a solvent, and which may include one or more optional components. The sensing polymer is typically present in the sensing polymer composition in an amount of from 90 to 100 wt %, from 95 to 100 wt %, 98 to 100 wt % or 100%, based on total solids of the composition.

The solvent component of the sensing polymer compositions is to allow formulation and casting of the composition, and may include a single solvent or a combination of two or more individual solvents. The solvent components should exhibit excellent solubility characteristics with respect to the sensing polymer and other non-solvent components of the compositions. The solvent will depend on the particular polymer and other components of the sensing polymer composition. The solvent can be chosen from water, aqueous solutions, organic solvents and mixtures thereof, with organic solvents being typical. Suitable organic solvents for the sensing polymer composition include, for example: alcohols such as $C_{1-9}$ straight or $C_{3-9}$ branched or cyclic monohydric alcohol such as methanol, ethanol, n-propyl alcohol, isopropyl alcohol, 1-butanol, 2-butanol, isobutyl alcohol, tert-butyl alcohol, 2-methyl-1-butanol, 1-pentanol, 2-pentanol, 4-methyl-2-pentanol, 1-hexanol, 1-heptanol, 1-octanol, 2-hexanol, 2-heptanol, 2-octanol, 3-hexanol, 3-heptanol, 3-octanol and 4-octanol, 2,2,3,3,4,4-hexafluoro-1-butanol, 2,2,3,3,4,4,5,5-octafluoro-1-pentanol, 2,2,3,3,4,4,5,5,6,6-decafluoro-1-hexanol, and $C_{5-9}$ fluorinated diols such as 2,2,3,3,4,4-hexafluoro-1,5-pentanediol, 2,2,3,3,4,4,5,5-octafluoro-1,6-hexanediol and 2,2,3,3,4,4,5,5,6,6,7,7-dodecafluoro-1,8-octanediol; esters such as ethyl lactate, methyl 2-hydroxyisobutyrate, propylene glycol methyl ether acetate, 3-methoxybutyl acetate, alkyl esters such as n-butyl acetate, propionates such as methyl methoxy propionate, n-butyl propionate, n-pentyl propionate, n-hexyl propionate and n-heptyl propionate, and alkyl butyrates such as n-butyl butyrate, isobutyl butyrate and isobutyl isobutyrate; ketones such as acetone, methyl ethyl ketone, cyclohexanone, 2,4 dimethyl-3-pentanone, 2,5-dimethyl-4-hexanone and 2,6-dimethyl-4-heptanone; aliphatic hydrocarbons such as n-heptane, n-nonane, n-octane, n-decane, 2-methylheptane, 3-methylheptane, 3,3-dimethylhexane and 2,3,4-trimethylpentane, and fluorinated aliphatic hydrocarbons such as perfluoroheptane; aromatic hydrocarbons such as anisole, toluene, xylene and mesitylene; ethers such as isopentyl ether, propylene glycol methyl ether, dipropylene glycol monomethyl ether and tetrahydrofuran: lactones such as gamma-butyrolactone and gamma valerolactone; lactams such as N-Methyl-2-pyrrolidone; amine-containing organic solvents such as trimethyl amine, triethyl amine, triisopropyl amine, aniline, pyrrolidine, piperidine and pyridine; and mixtures containing one or more of these solvents. Of these organic solvents, alcohols, aliphatic hydrocarbons and ethers are preferred. The solvent component of the sensing polymer composition is typically present in an amount of from 80 to 99 wt %, more typically, from 90 to 99 wt % or from 95 to 99 wt %, based on the total weight of the sensing polymer composition.

The sensing polymer composition can include one or more optional components chosen, for example, from cross-linkers, surfactants, antioxidants, colorants, adhesion promoters, or combinations thereof. Such optional additives if used are each typically present in the composition in minor amounts based on total solids of the composition. The optional additives and amounts should be selected such that the sensing characteristics of the polymeric sensing layer for the analyte of interest are not adversely impacted.

Depending on the particular polymer in the sensing polymer composition, it may be desirable to include a crosslinker in the sensing polymer composition, for example, to provide improved mechanical properties such as strength or elasticity to the sensing polymer in the sensing polymer layer. Suitable crosslinkers will depend on the polymer in the sensing composition and may be chosen, for example, from: melamine compounds such as hexamethylol melamine, hexamethoxymethyl melamine, hexamethylol melamine compounds having 1 to 6 methylol groups methoxymethylated, hexamethoxyethyl melamine, hexacyloxymethyl melamine, and hexamethylol melamine compounds having 1 to 6 methylol groups acyloxymethylated; guanamine compounds such as tetramethylol guanamine, tetramethoxymethyl guanamine, tetramethylol guanamine compounds having 1 to 4 methylol groups methoxymethylated, tetramethoxyethyl guanamine, tetraacyloxyguanamine, tetramethylol guanamine compounds having 1 to 4 methylol groups acyloxymethylated, and benzoquanamine compounds; glycoluril compounds having substituted thereon at least one group chosen from methylol, alkoxymethyl and acyloxymethyl groups such as tetramethylol glycoluril, tetramethoxyglycoluril, tetramethoxymethyl glycoluril, tetramethylol glycoluril compounds having 1 to 4 methylol groups methoxymethylated, and tetramethylol glycoluril compounds having 1 to 4 methylol groups acyloxymethylated; urea compounds having substituted thereon at least one group chosen from methylol, alkoxymethyl and acyloxymethyl groups such as tetramethylol urea, tetramethoxymethyl urea, tetramethylol urea compounds having 1 to 4 methylol groups methoxymethylated, and tetramethoxyethyl urea; epoxy compounds such as such as tris(2,3-epoxypropyl)isocyanurate, trimethylolmethane triglycidyl ether, trimethylolpropane triglycidyl ether, and triethylolethane triglycidyl ether; isocyanate compounds, azide compounds; hydroxy-containing compounds; or compounds having a double bond such as an alkenyl ether group. These compounds may be used as an additive or introduced into a polymer side chain as a pendant group. A crosslinker, if used, is typically present in the sensing polymer composition in an amount of from 0.5 to 50 wt % or from 0.5 to 25 wt % based on total solids of the sensing polymer composition.

Typical surfactants include those which exhibit an amphiphilic nature, meaning that they can be both hydrophilic and hydrophobic at the same time. Amphiphilic surfactants possess a hydrophilic head group or groups, which have a strong affinity for water and a long hydrophobic tail, which is organophilic and repels water. Suitable surfactants can be ionic (i.e., anionic, cationic) or nonionic. Further examples of surfactants include silicone surfactants, poly(alkylene oxide) surfactants, and fluorochemical surfactants. Suitable non-ionic surfactants include, but are not limited to, octyl and nonyl phenol ethoxylates such as TRITON® X-114, X-100, X-45, X-15 and branched secondary alcohol ethoxylates such as TERGITOL™ TMN-6 (The Dow Chemical Company, Midland, Michigan USA). Still further exemplary surfactants include alcohol (primary and secondary) ethoxylates, amine ethoxylates, glucosides, glucamine, polyethylene glycols, poly(ethylene glycol-co-propylene glycol), or other surfactants disclosed in *McCutcheon's Emulsifiers and Detergents*, North American Edition for the Year 2000 published by Manufacturers Confectioners Publishing Co. of Glen Rock, N.J. Nonionic surfactants that are acetylenic diol derivatives also can be suitable. Such surfactants are commercially available from Air Products and Chemicals, Inc. of Allentown, PA and sold under the trade names of SURFYNOL and DYNOL. Additional suitable surfactants include other polymeric compounds such as the tri-block EO-PO-EO co-polymers PLURONIC 25R2, L121, L123, L31, L81, L101 and P123 (BASF, Inc.). A surfactant, if used, is typically present in the sensing polymer composition in an amount of from 0.01 to 10 wt % based on total solids of the sensing polymer composition.

An antioxidant can be included in the sensing polymer compositions to prevent or minimize oxidation of organic materials in the sensing polymer compositions. Suitable antioxidants include, for example, phenol-based antioxidants, antioxidants composed of an organic acid derivative, sulfur-containing antioxidants, phosphorus-based antioxidants, amine-based antioxidants, antioxidant composed of an amine-aldehyde condensate and antioxidants composed of an amine-ketone condensate. Examples of the phenol-based antioxidant include substituted phenols such as 1-oxy-3-methyl-4-isopropylbenzene, 2,6-di-tert-butylphenol, 2,6-di-tert-butyl-4-ethylphenol, 2,6-di-tert-butyl-4-methylphenol, 4-hydroxymethyl-2,6-di-tert-butylphenol, butylhydroxyanisole, 2-(1-methylcyclohexyl)-4,6-dimethylphenol, 2,4-dimethyl-6-tert-butylphenol, 2-methyl-4,6-dinonylphenol, 2,6-di-tert-butyl-α-dimethylamino-p-cresol, 6-(4-hydroxy-3,5-di-tert-butylanilino) 2,4-bis-octyl-thio-1,3,5-triazine, n-octadecyl-3-(4'-hydroxy-3',5'-di-tert-butylphenyl)propionate, octylated phenol, aralkyl-substituted phenols, alkylated p-cresol and hindered phenol; bis-, tris- and poly-phenols such as 4,4'-dihydroxydiphenyl, methylene-bis(dimethyl-4,6-phenol), 2,2'-methylene-bis-(4-methyl-6-tert-butylphenol), 2,2'-methylene-bis-(4-methyl-6-cyclohexylphenol), 2,2'-methylene-bis-(4-ethyl-6-tert-butylphenol), 4,4'-methylene-bis-(2,6-di-tert-butylphenol), 2,2'-methylene-bis-(6-α-methyl-benzyl-p-cresol), methylene-crosslinked polyvalent alkylphenol, 4,4'-butylidenebis-(3-methyl-6-tert-butylphenol), 1,1-bis-(4-hydroxyphenyl)-cyclohexane, 2,2'-dihydroxy-3,3'-di-(α-methylcyclohexyl)-

5,5'-dimethyldiphenylmethane, alkylated bisphenol, hindered bisphenol, 1,3,5-trimethyl-2,4,6-tris(3,5-di-tert-butyl-4-hydroxybenzyl)benzene, tris-(2-methyl-4-hydroxy-5-tert-butylphenyl)butane, and tetrakis-[methylene-3-(3',5'-di-tert-butyl-4'-hydroxyphenyl)propionate]methane. Suitable antioxidants are commercially available, for example, Irganox™ antioxidants (Ciba Specialty Chemicals Corp.). An antioxidant, if used, is typically present in the sensing polymer composition in an amount of from 0.01 to 10 wt % based on total solids of the sensing polymer composition.

Colorants include, for example, dyes and pigments, and may be desired for improving one or more of measurability of the polymeric sensing layer thickness, ability to inspect coating quality, ability to align the sensing layer to the underlying substrate, or cosmetic appearance. Suitable colorants include, for example, extender pigments such as alumina hydrate, clay, barium carbonate and barium sulfate; inorganic pigments such as zinc oxide, flake white, chrome yellow, red oxide, ultramarine blue, iron blue, titanium oxide, zinc chromate, red ocher and carbon black; organic pigments such as brilliant carmine 6B, permanent red 6B, permanent red R, benzidine yellow, copper phthalocyanine blue and copper phthalocyanine green; basic dyes such as magenta and rhodamine; direct dyes such as direct scarlet and direct orange; acidic dyes such as rhoserine and metanil yellow. A colorant, if used, is typically present in the sensing polymer composition in an amount of from 0.01 to 10 wt % based on total solids of the sensing polymer composition.

Use of an adhesion promoter in the sensing polymer compositions may improve adhesion of the polymeric sensing layer to the underlying substrate. Suitable adhesion promoters include, for example: sulfur-containing compounds such as dithioglycerol, bis (2,3-dihydroxypropyl-thio)ethylene, sodium 3-(2,3-dihydroxypropylthio)-2-methyl-propylsulfonate, 1-thioglycerol, sodium 3-mercapto-1-propanesulfonate, 2-mercaptoethanol, thioglycolic acid, and 3-mercapto-1-propanol; aromatic hydroxy compounds such as phenol, cresol, xylenol, pyrocatechol, tort-butylcatechol, resorcinol, hydroguinone, pyrogallol, 1,2,4-benzenetriol, salicyl alcohol, p-hydroxybenzyl alcohol, o-hydroxybenzyl alcohol, p-hydroxyphenethyl alcohol, p-aminophenol, m-aminophenol, aminophenol, aminoresorcinol, p-hydroxybenzoate, o-hydroxybenzoic acid, 2,4-dihydroxybenzoic acid, 2,5-dihydroxybenzoic acid, 3,4-dihydroxybenzoic acid, 3, 5-dihydroxybenzoic acid, and gallic acid; benzotriazole-based compounds such as benzotriazole, 5,6-dimethylbenzotriazole, 1-hydroxybenzotriazole, 1-methylbenzotriazole, 1-aminobenzotriazole, 1-phenylbenzotriazole, 1-hydroxymethylbenzotriazole, methyl 1-benzotriazole carboxylate, 5-benzotriazole carboxylic acid, 1-methoxy-benzotriazole, 1-(2,2-dihydroxyethyl)-benzotriazole, 1-(2,3-dihydroxypropyl) benzotriazole or 2,2'-{[(4-methyl-1H-benzotriazole-1-yl) methyl]imino}bisethanol, 2,2'-{[(5-methyl-1H-benzotriazole-1-yl) methyl]imino} bisethanol, 2,2'-{[(4-methyl-1H-benzotriazole-1yl)methyl]imino} bisethane, and 2,2'-{[(4-methyl-1H-benzotriazole-1-yl) methyl]imino}bispropane; triazine-based compounds such as 1,3,5-triazine-2,4,6-trithol, and silicon-containing compounds such as 1,3,5-triazine-2,4,6-trithol. An adhesion promoter, if used, is typically present in the sensing polymer composition in an amount of from 0.05 to 10 wt % based on total solids of the sensing polymer composition.

The sensing polymer compositions can be prepared following known procedures and/or are commercially available. For example, the compositions can be prepared by dissolving the sensing polymer and other optional solid components of the composition in the solvent components. The desired total solids content of the compositions will depend on factors such as the particular polymer(s) in the composition and desired final thickness of the polymeric sensing layer. Typically, the solids content of the sensing polymer compositions is from 1 to 20 wt %, more typically from 1 to 10 wt % or from 1 to 5 wt %, based on the total weight of the sensing polymer composition.

During sensor formation, the sensing polymer compositions can be applied by spin-coating, dipping, drop-casting, roller-coating, screen printing, ink-jet printing, gravure or other conventional coating techniques. Of these coating techniques, spin-coating is typical. For spin-coating, the solids content of the sensing polymer composition can be adjusted to provide a desired film thickness based upon the specific coating equipment utilized, the viscosity of the solution, the spin-speed of the coating tool and the amount of time allowed for spinning.

The polymeric sensing layer is typically cured at elevated temperature to remove substantially all of the solvent from the layer, thereby forming a tack-free coating and improving adhesion of the layer to the underlying structure. Depending on the particular polymer and components of the composition, the cure may cause further change to the polymer, for example, through one or more of oxidation, outgassing, polymerization, condensation, or cross-linking. The cure is typically conducted on a hotplate or in an oven. The cure can be conducted, for example, in an atmosphere of air or inert gas such as nitrogen, argon or helium, or can be conducted under vacuum. In a preferred aspect of the invention, the polymeric sensing layer is cured in an inert gas atmosphere. The temperature and time for the cure will depend, for example, on the particular polymer and solvent of the sensing polymer composition, and the layer thickness. Typical cure temperatures are from 100 to 450° C., with temperatures of from 300 to 400° C. or from 325 to 350° C. being preferred. Preferably, the cure is conducted at a temperature from 300 to 400° C. or from 325 to 350° C. in an inert gas atmosphere. The cure time is typically from 30 seconds to two hours, preferably from 10 to 90 minutes or from 50 to 70 minutes. The cure can be conducted in a single step or in multiple steps. The cure can be conducted by heating the polymeric sensing composition layer at constant temperature or with a varied temperature profile such as a ramped or terraced temperature profile.

Preferred sensing polymer compositions of the invention, such as those cured at preferred conditions described above, can exhibit beneficial characteristics for example a high analyte sensitivity and excellent stability over time. Without wishing to be bound by any particular theory, it is believed that curing of the sensing polymer compositions under preferred conditions can effectively crosslink the polymer while minimizing or eliminating oxidation. The presence and extent of crosslinking of the sensing polymer can be seen by the combination of FTIR and Raman spectra of the cured sensing polymer layer. In one aspect, preferred cured polymeric sensing layers exhibit FTIR spectra having a preferred ratio of total peak area from 1648 to 1690 cm- to total peak area from 1480 to 1522 $cm^{-1}$ of 0.15 or less. The FTIR peak ratio is believed to be demonstrative of the extent of oxidation of the pre-cured sensing polymer that occurs during the curing process. In another aspect, preferred polymeric sensing layers exhibit Raman spectra having a preferred ratio of total peak area from 2190 to 2250 $cm^{-1}$ to total peak area from 1550 to 1650 $cm^{-1}$ of 1.0 or less. The Raman peak ratio is believed to be demonstrative of the extent of reaction of alkynes in the pre-cured sensing polymer that occurs during the curing process. Preferred polyarylene sensing polymers of the invention do not exhibit an increase in oxygen content during cure. Preferably, the cured polymeric sensing layers have an oxygen content of 7 atomic % or less, as measured by x-ray photoelectron spectroscopy. The oxygen content is believed to be demonstrative of the extent of oxidation of the pre-cured sensing polymer.

The thickness of the polymeric sensing layer is not particularly limited and will depend, for example, on the particular polymer, sensor type and sensor geometry. The thickness for the polymeric sensing layer is typically from 10 nm to 10 microns. In the case of an acoustic wave sensor, the thickness is typically from 10 to 1000 nm, from 50 to 500 nm or from 100 to 400 nm. The sensing layer in capacitive and conductometric sensors is typically from 1 to 10 microns. If a thick polymeric layer is desired, the coating and optional cure can be repeated one or more additional times. The upper limit on thickness of the polymeric sensing layer may be dictated on the particular type of sensor. For example, in the case of an acoustic wave sensor, oscillation capability of the piezocrystal layer may dictate the upper thickness limit, with a thicker layer typically inhibiting oscillation.

Without limitation thereto, gas sensors of the invention to which polymeric sensing layers can be applied include acoustic wave, capacitive and conductometric sensors. The invention will further be described with reference to FIGS. 1-4, which illustrate exemplary such gas sensors in accordance with the invention.

Figure 1:
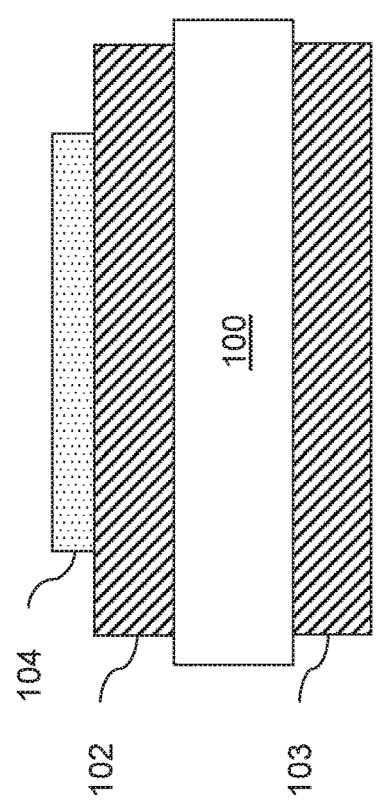
FIG. 1 illustrates in cross-section a quartz crystal microbalance sensor in accordance with the invention.
Figure 3:
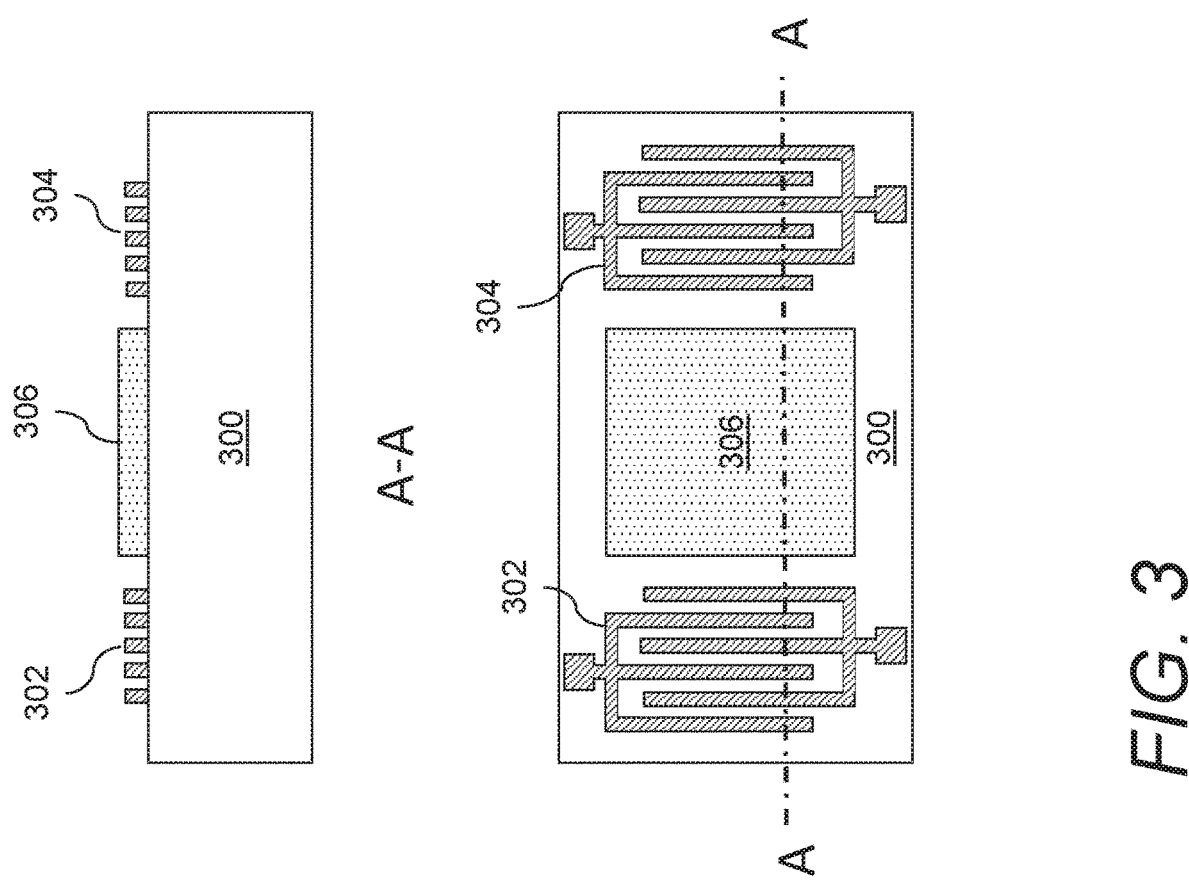
FIG. 3 illustrates in cross-section and top-down views a surface acoustic wave sensor in accordance with the invention.

FIGS. 1-3 illustrate various acoustic wave sensors in accordance with the invention. Suitable acoustic wave sensors include, for example, bulk acoustic wave sensors such as quartz-crystal microbalance and film bulk acoustic resonator sensors, and surface acoustic wave sensors. Such sensors types, and acoustic wave sensors in general, as well as their manufacture, are known in the art and described, for example, in D. S. Ballantine et al, *Acoustic Wave Sensors Theory, Design, and Physico-Chemical Applications*, Academic Press (1997), G. Korotcenkov, *Handbook of Gas Sensor Materials: Properties, Advantages and Shortcomings for Applications Volume 1: Conventional Approaches, Integrated Analytical Systems*, Springer (2013). Application of polymeric sensing layers as described herein to acoustic wave sensors can allow for sensing of gas-phase analytes include, for example, one or more benzene, toluene, xylene, mesitylene, ethanol, formaldehyde, acetaldehyde, acetone, acetic acid, or a trialkylamine. The sensors are particularly suited for the sensing of organic materials.

Any piezoelectric material (crystal) which exhibits a piezoelectric effect can be used for the piezoelectric layer in the acoustic wave sensor. Typical piezoelectric materials include, for example, gallium phosphate, quartz, tourmaline, barium titanate, magnesium niobate-lead titanate, lead-zirconate titanate, lithium niobate, lithium tantalite, aluminum nitrate, or zinc oxide. Typically, the piezoelectric material has a fundamental mode in a frequency range of from 20 kHz to 100 MHz, typically from 0.1 to 50 MHz, and more typically from 0.1 to 30 MHz. Optionally, detection using harmonics can be used in a higher frequency range, for example, from 1 MHz to 20 GHz, or from 30 MHz to 500 MHz.

Depending on sensor type and design, the polymeric sensing layer may be disposed over the piezoelectric layer, either directly on (i.e., in physical contact with) or with one or more intervening layers between it and the piezoelectric layer. In some sensor designs, the polymeric sensing layer may be disposed over an electrode of the sensor which in turn may be disposed over the piezoelectric layer, such as in certain QCM or FBAR sensors. In some sensor designs, the polymeric sensing layer may be disposed between electrodes, such as in a SAW sensor.

FIG. 1 illustrates in cross-section an illustrative QCM sensor which includes a quartz crystal (piezoelectric) resonating layer (crystal) 100, a front (i.e., sensing side) electrode 102 over a front surface of the resonating layer, a rear electrode 103 over a rear surface of the resonating layer, and a polymeric sensing layer 104 as described herein disposed over the front electrode 102. The electrodes are made of a metal, typically gold or titanium, and can be formed by a metallization process such as plating, sputtering or evaporation. The QCM system further includes a metal quartz crystal holder and electronics for supplying power and controlling and measuring resonant frequency. Analyte detection can be conducted by measuring the frequency shift caused by mass loading of the polymeric sensing layer with the analyte. Knowledge of the chemical affinity of the sensing layer for the analyte molecules allows for correlation of resonant frequency shift to analyte concentration. The operating frequencies of QCM sensors of the invention are typically from 5 to 300 MHz. QCM sensors are known in the art (e.g., U.S. Pat. No. 6,156,578A). QCM sensors in accordance with the invention can be made by persons skilled in the art. Additionally, QCM sensors suitable for use in forming a sensor in accordance with the invention are commercially available, for example, those available from Stanford Research Systems and Inficon. Also, commercially available are microbalances using piezoelectric materials other than quartz, for example, langasite and gallium phosphate. Such commercial sensors can be modified, for example, by applying a layer of a sensing polymer composition as described herein over the front electrode 102 to form polymeric sensing layer 104.

FIG. 2 illustrates in cross-section an exemplary film bulk acoustic resonator (FBAR) sensor in accordance with the invention. The FBAR sensor includes a substrate 200, typically formed from single-crystal silicon, on which is disposed an insulating layer 202, a front (i.e., sensing side) electrode 204, a piezoelectric layer 206, rear electrode 208, and a polymeric sensing layer 210 as described herein disposed in cavity 212 formed in the substrate. FBAR sensors are typically formed by silicon micromachining techniques known to those skilled in the art (e.g., A. Lin et al, "Explosive trace detection with FBAR-based sensor," 2008 *IEEE 21st International Conference on Micro Electro Mechanical Systems*, Tucson, AZ, 2008, pp. 208-211). An exemplary fabrication process includes deposition of the insulating layer 202, typically low stress LPCVD silicon nitride, on a single-crystal silicon wafer substrate 200. The nitride on the front side of the wafer is typically patterned in a photolithographic process (e.g., photoresist coating, exposure, development, etching) to form openings exposing the silicon substrate. The exposed portion of the silicon substrate is next etched, typically by wet-etching such as with a KOH solution, to form cavity 212 in the silicon front surface. Front electrode 204 can next be formed, for example, by evaporation and then patterned. A typical electrode material is gold, with chromium as an adhesive layer. The piezoelectric layer 206, for example, a ZnO layer, can next be sputter-deposited and patterned. The rear electrode 208 can next be formed (e.g., a layer of gold over chromium) by evaporation followed by patterning such as by lift-off technique. The polymeric sensing layer 210 can next be formed as described herein on the insulating layer on the substrate front side in cavity 212. Electronics such as described with reference to FIG. 1 are provided for supply of power and control and measurement of resonant frequency. Analyte detection and measurement can be conducted in a similar manner to that described for the QCM. The operating frequencies of FBAR sensors of the invention are typically from 500 MHz to 20 GHz.

FIG. 3 illustrates in cross-section and top-down view an exemplary surface acoustic wave sensor in accordance with the invention. The SAW sensor includes a piezoelectric substrate (layer) 300, an input interdigitated transducer (IDT) 302, an output interdigitated transducer 304, and input and output electrical circuits (not shown). Typical materials for the piezoelectric substrate include, for example, quartz, lithium niobate, lithium tantalite, aluminum nitride, or zinc oxide. The input IDT and output IDT comprise a thin film interdigitated electrode pattern formed over the piezoelectric layer 300. These structures are typically formed by depositing a thin metal layer on the piezoelectric substrate, followed by lithographically patterning the metal film. Typical materials for the input and output IDT electrodes are gold, chromium, aluminum, or a composite thereof, such as gold on chromium or gold on chromium and aluminum. A polymeric sensing layer 306 as described herein is provided over the piezoelectric layer 300 and is disposed between the input IDT electrode 302 and output IDT electrode 304.

SAW sensors of the invention can be made by methods known to those skilled in the art. SAW sensors are described, for example, in U.S. Pat. No. 9,329,154B1. The SAW sensor can include additional transducers and/or additional circuits. When the IDT 302 is stimulated by an input electrical circuit, the IDT as part of a piezoelectric circuit with the piezoelectric substrate, converts electrical charge to mechanical deformation of the substrate surface at an oscillating frequency related to the alternating frequency of an input electrical signal. The input electrical signal generates a surface acoustic wave through the inverse piezoelectric effect that propagates through the piezoelectric substrate 300. When the surface acoustic wave impacts the output IDT 304, the surface acoustic wave is converted back into an electrical signal by the direct piezoelectric effect which generates an output electrical signal at the output IDT 304. The magnitude of the output electrical signal is directly related to the magnitude of the surface acoustic wave. As discussed above, the polymeric sensing layer 306 is capable of selectively interacting with a gas-phase analyte of interest. When molecules of the analyte are adsorbed by the polymeric sensing layer, the mass density of the sensing layer increases. Such increase alters or retards propagation of the surface acoustic wave through the SAW device, which may be registered, for example, as a phase shift in the surface acoustic wave that is directly proportional to the amount of adsorbed analyte.

Figure 4:
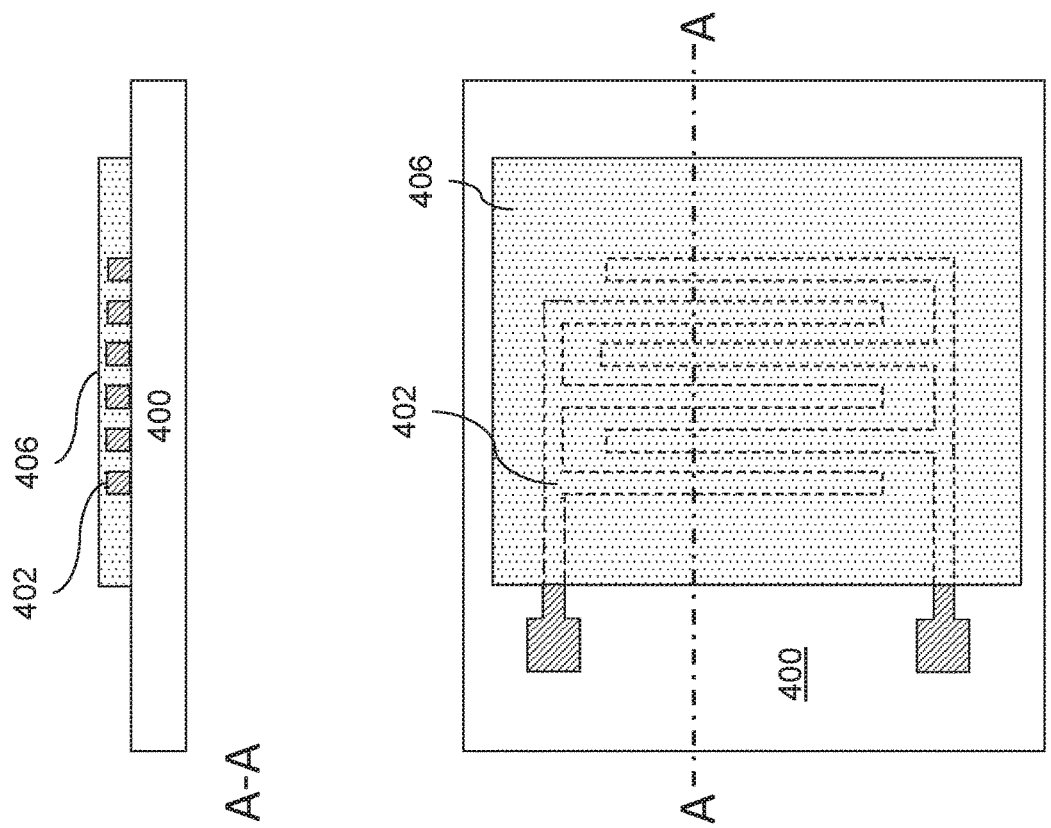
FIG. 4 illustrates in cross-section and top-down views a capacitive and a conductometric gas sensor in accordance with the invention.

FIG. 4 illustrates in cross-section and top-down view a capacitive gas sensor and a conductometric (or resistive) gas sensor in accordance with the invention. The sensor includes a substrate 400, an interdigitated electrode (IDE) 402 on the substrate, and a polymeric sensing layer 406 as described herein disposed over the substrate 400 and IDE 402. Typical materials for the substrate include, for example, glass or silicon. The IDE is typically formed by depositing a thin metal layer on the substrate, followed by lithographically patterning the metal film. The IDE is typically gold or a composite of gold on chromium. A polymeric sensing layer 406 as described herein is provided over the substrate 400 and IDE 402. The sensor may further be provided with a heating element (not shown). In the case of a capacitive sensor, dielectric permittivity is measured by application of an alternating voltage and altering its frequency over time. Permittivity is calculated from the current and phase relationship. In the case of conductometric (or resistive) gas sensors, change in electrical conductivity (or resistance) of the device is measured, for example, as a change in current which can be correlated to content of the analyte in the sensing layer. Capacitive and conductometric sensors in accordance with the invention which include a layer of the polyarylene sensing material described herein can be made by persons skilled in the art.

Gas sensors of the invention can be used by exposing the polymeric sensing layer to an atmosphere to be monitored for sensing of a gas-phase analyte of interest. In the case of an acoustic wave sensor, the resonant frequency of the sensor can be monitored in response to the presence of the gas-phase analyte on the polymeric sensing layer. The change in signal can, via downstream processors, be converted directly into changes in mass and can be visualized on a display.

Suitable analytes include those in gas or vapor (collectively, gas) form for adsorption to the polymeric sensing layer. The analyte is typically in gas or liquid phase at room temperature. Liquid analytes are typically heated to increase their gas-phase concentration to promote interaction with the polymeric sensing layer. Sensors of the invention are particularly suited to measure organic analytes. Suitable organic analytes include, for example, one or more of benzene, toluene, xylene, mesitylene, ethanol, formaldehyde, acetaldehyde, acetone, acetic acid, or a trialkylamine. The sensors may additionally or alternatively be used for inorganic analytes, for example, water vapor or carbon dioxide.

Figure 5:
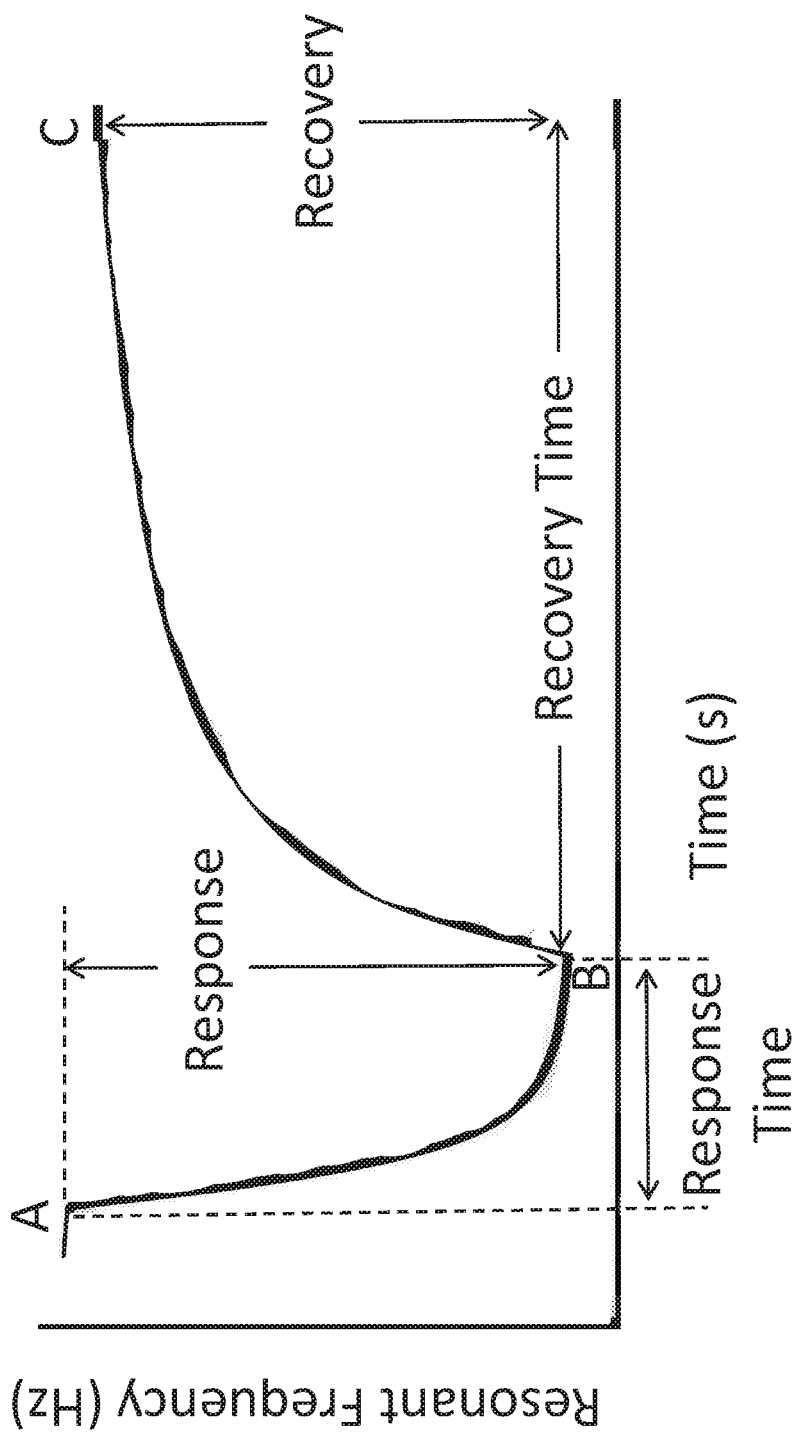
FIG. 5 is a representative plot of resonant frequency vs. time showing response to an analyte and recovery of an acoustic wave sensor in accordance with the invention.

Preferred gas sensors of the invention can serve repeated uses for sensing an analyte of interest. In such case, the interaction between the analyte and polymeric sensing layer is reversible. FIG. 5 is a representative plot of resonant frequency vs. time for an acoustic wave sensor in accordance with the invention showing response and recovery to an analyte. The sensor exhibits an initial baseline resonant frequency at reference A prior to being dosed with the analyte. Exposure of the sensor to the analyte begins at reference A until reaching full response at reference B. The reduction in resonant frequency is an indication of interaction between the analyte and polymeric sensing layer. Such interaction is believed to be due to the sensing layer having an affinity for, but not forming a covalent bond with, the analyte at the desired operating temperature of the sensor. Without wishing to be bound by any particular theory, such interaction is believed to be one or more of physisorption, chemisorption, co-miscibility, charge-coupled complexation, hydrogen bonding, ionic bonding, and the like. Dosage of the analyte is then terminated, with the sensor being exposed to atmosphere, inert gas or other ambient conditions essentially free of the analyte. As the interaction between the analyte and polymeric sensing layer begins to reverse, for example, by desorption or dissociation, the resonant frequency increases with time until reaching a new baseline level at reference C. The new baseline level resonant frequency may be the same as or different from the original baseline level depending, for example, on strength of polymer-analyte interaction, pre- and post-dosing changes in humidity or modulus, e.g., shear and/or elastic as a result of analyte-sensing polymer film interactions, or azeotropic analyte removal.

In FIG. 5, "Response" is the change in measured resonant frequency (Hz) of the sensor from the initial (pre-dose) baseline to the full response value for the analyte. "Recovery" is the change in measured resonant frequency (Hz) of the sensor from full response to the new baseline C after purging the analyte from the sensor. "Recovery Time" is the time taken for the polymeric sensing layer to reach the new baseline level at reference C from full response at reference B. The percent recovery is equal to the ratio of Recovery/Response for a given analyte. Preferable sensors in accordance with the invention can exhibit 50% or greater recovery, more preferably, 60% or greater recovery, 70% or greater recovery, 80% or greater recovery, or 90% or greater recovery. Preferably, such recoveries are achieved within a time of 90 minutes, more preferably within 60 minutes, within 30 minutes, or within 15 minutes. Preferably, such recoveries take place at room temperature (e.g., 20-30° C.), but may be conducted at a higher temperature, for example, at a temperature of up to 100° C. The temperature limit for a given sensor will depend, for example, on the materials of construction of the sensor, such as on properties of the polymeric sensing layer (e.g., glass transition temperature of the polymer). If used, sensor heating can be conducted, for example, by use of an internal or external heater, or by use of a heated purge gas for contacting the polymeric sensing layer. A sensor recovery of 50% or greater within a time of 90 minutes at room temperature is typical. Analogous results can be demonstrated for other sensor types such as capacitive and conductometric sensors.

The above-described characteristics can allow for sensors of the invention to be used repeatedly. For example, sensors of the invention can be exposed to a second atmosphere effective to reduce the content of the gas-phase analyte in the sensor. The property of the gas sensor type being measured, for example, resonant frequency of an acoustic wave sensor, is allowed to recover to a baseline level. The sensor can then be exposed to a third atmosphere comprising a gas-phase analyte. This gas-phase analyte can be the same or different from that sensed in the prior measurement. This sequence of measurements can be repeated one or more times.

The following non-limiting examples are illustrative of the invention.

EXAMPLES

Sensing Polymer Synthesis

The following Polymers A-E were synthesized using the procedures described below. Number average molecular weight ($M_n$), weight average molecular weight ($M_w$) and polydispersity (PDI=$M_w/M_n$), where reported, were determined by gel permeation chromatography (GPC) based on polystyrene standard. Polymer F is a commercial material sold as SiLK™ J polyarylene resin by Dupont Electronics & Imaging.

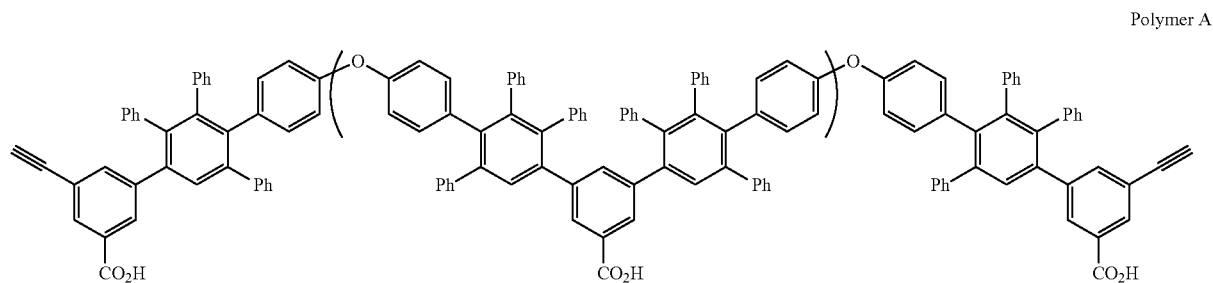

Polymer A

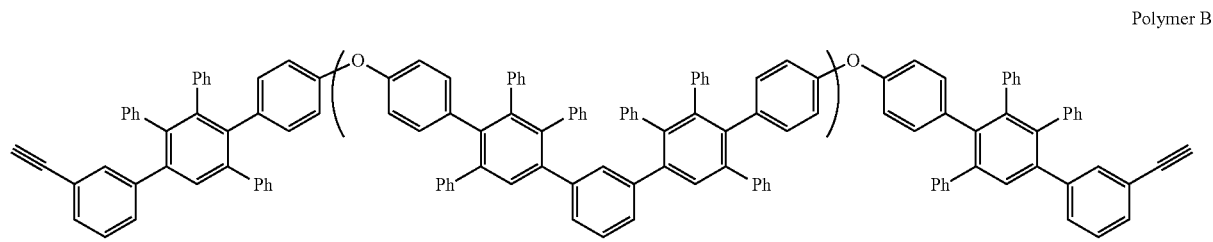

Polymer B

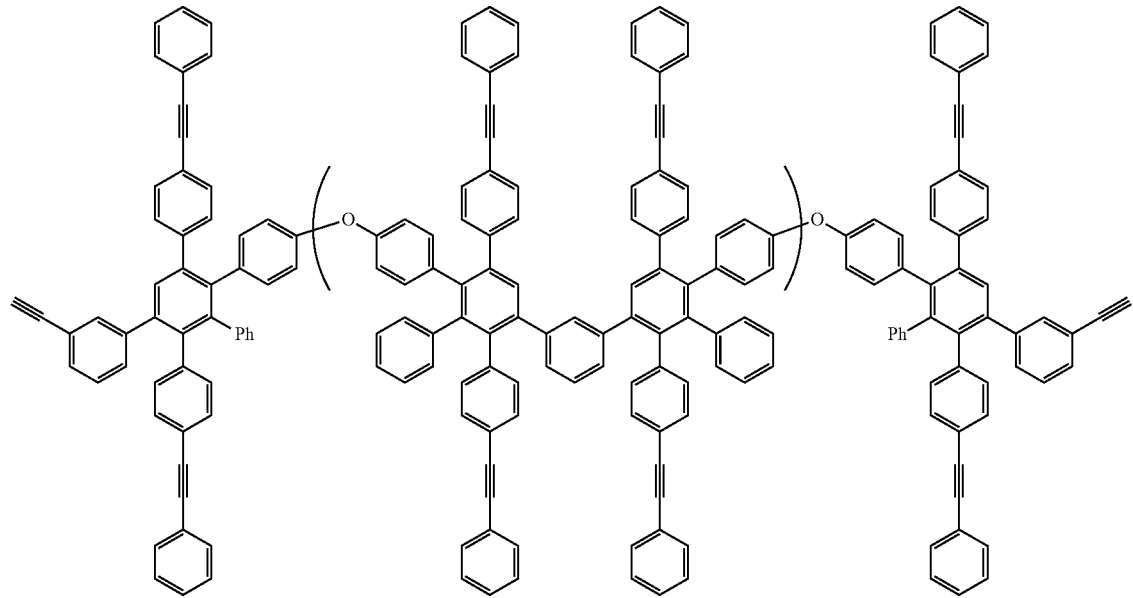
Polymer C
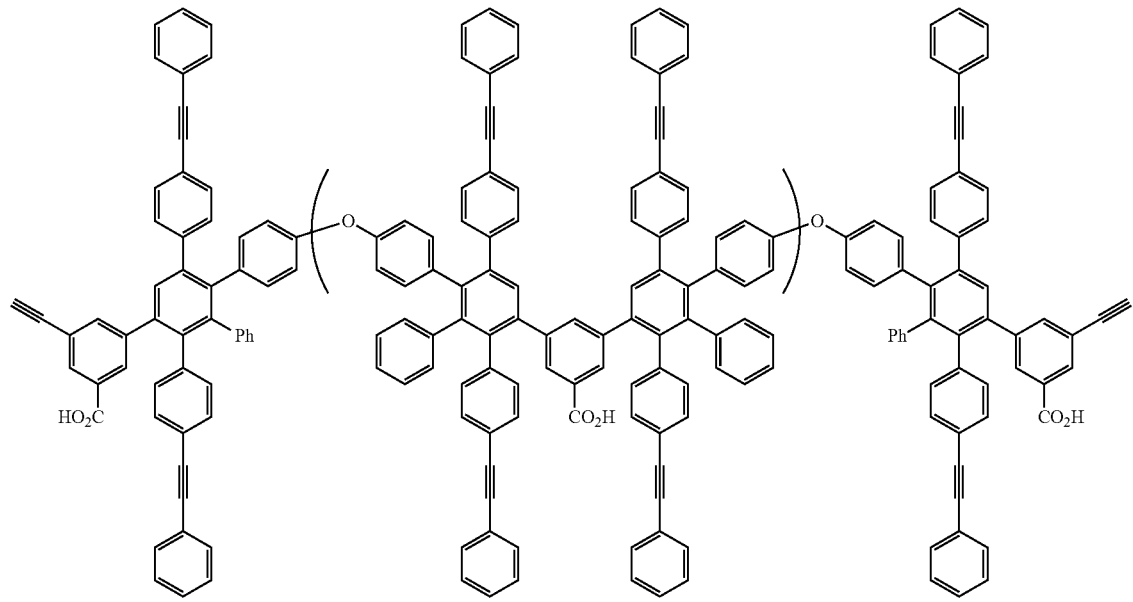
Polymer D

-continued

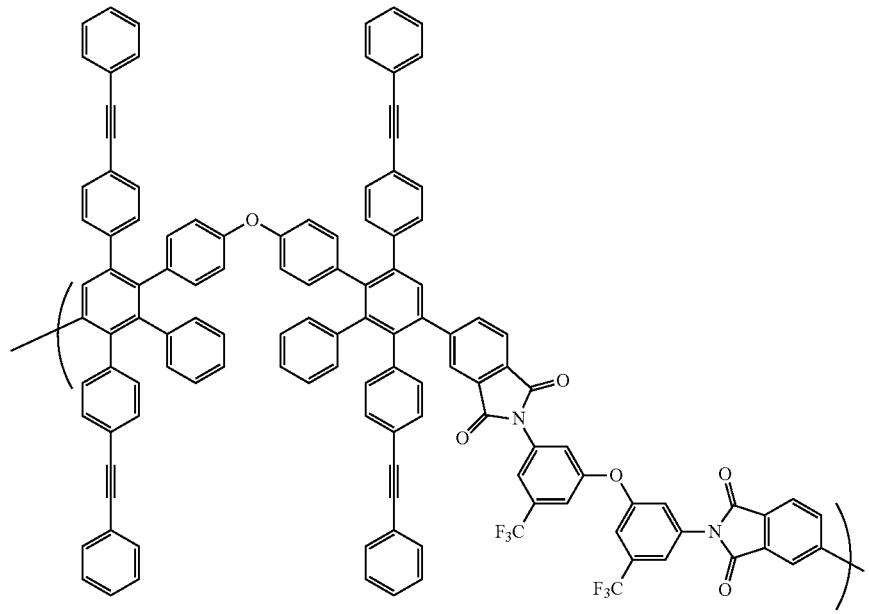

Polymer E

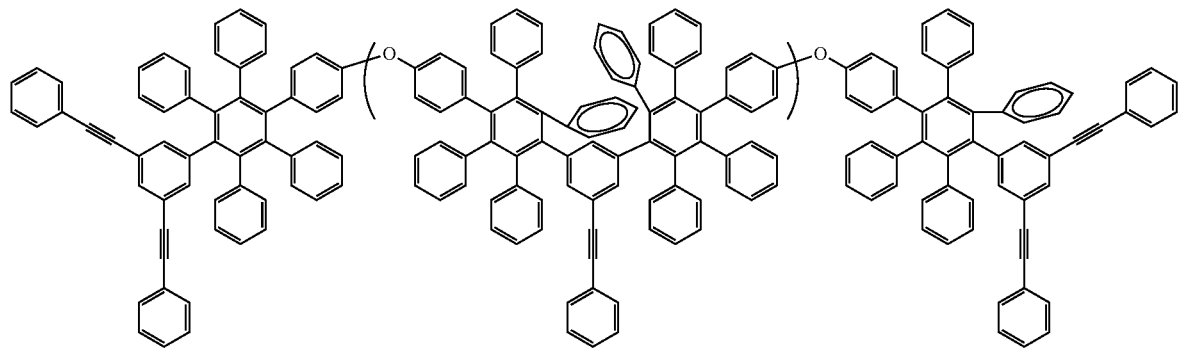

Polymer F

Synthetic Example 1

A 4-liter cylindrical reactor was charged with 485.010 g diphenylene oxide bis(triphenylcyclopentadienone) (DPO-CPD), 27.370 g of 3,5-diethynylbenzoic acid (DEBzOH), and 2422 g of γ-butyrolactone (GBL) at room temperature. The top of the flask was then equipped with a dry ice condenser, a thermocouple with a temperature controller, $N_2$ inlets, and a stir system. The reactor was placed into a fitted heating mantle. The system was evacuated and purged three times with $N_2$ to remove air from the vessel, which was subsequently blanketed with a constant flow of $N_2$. The reaction system was then heated to an internal temperature of 135° C. After 1 hour, the system was allowed to cool to 90° C., followed by adding a second aliquot (27.780 g) of DEBzOH to the flask, together with an additional 300 g of GBL. The reaction mixture was again heated to 135° C. and kept at this temperature for 1 hour. The system was again allowed to cool to 90° C., followed by adding a third aliquot (27.110 g, 0.25 equivalents) of DEBzOH to the flask, along with an additional 330 g GBL. The reaction mixture was again heated to 135° C. and kept at this temperature for 1 hour, after which time the system was again allowed to cool to 90° C., followed by adding a fourth aliquot (30.763 g, 0.29 equivalents) of DEBzOH to the flask, together with an additional 330 g GBL. The reaction mixture was again heated to 135° C. and kept at this temperature for 6 hours. The reaction mixture was then cooled to room temperature. The resulting diethynylbenzoic acid-biscyclopentadienyl polyarylene polymer was isolated from the reaction mixture by precipitating it from solution by adding isopropanol at room temperature, filtered, and washed with additional isopropanol before the filtrate was dried at 70° C. for 24 hours, yielding Polymer A. [Polymer A: $M_n$=10.26 kDa; $M_w$=21.33 kDa; PDI=2.08].

Synthetic Example 2

DPO-CPD (109.42 g) and 1,3-diethynylbenzene (18.34 g) were added to a 1 L OptiMax reactor (glass lined, with TEFLON™ fluoropolymer drainage plug). Ethoxybenzene solvent (309 g) was added to form a deep maroon heterogeneous mixture. The reactor was transferred to an OptiMax Synthesis Workstation and sealed under an atmosphere of nitrogen gas. To the reactor top were affixed a stirring rod with a 4-paddle stirrer (elevated to 1 cm from the reactor bottom), a water-cooled reflux condenser, an internal thermocouple (placed at the median depth of the mixture, radially disposed halfway between the stirring shaft and the reactor wall), and a 1 cm baffle (placed perpendicular and adjacent to the outer wall of the reactor). The reactor was set to an internal temperature of 25° C. and stirring was initiated at 100 rpm to mix the heterogeneous contents. After a 30-minute equilibration period at 25° C., the reactor was warmed at a rate of 1° C./min. until reaching an internal temperature of 115 to 135° C. The reactor was maintained at target temperature for a period of 18 hours. The reactor was then cooled to 25° C. at a rate of 1° C./min. The contents of the reactor were then transferred through the outlet at the bottom of the reactor to a bottle, yielding Polymer B. [Polymer B: $M_n$=37.02 kDa; $M_w$=105.95 kDa; PDI=2.86].

Synthetic Example 3

4,4'-(oxybis(4,1-phenylene))bis(3-phenyl-2,5-bis(4-(phenylethynyl)phenyl)cyclopenta-2,4-dien-1-one (A4B2) (200 g, 1 equivalent) and 1,3-diethynylbenzene (21.7 g, 1.02 equivalent) were added to a 1 L OptiMax reactor (glass lined, with TEFLON™ fluoropolymer drainage plug). Anisole solvent was added in an amount to provide a solution containing 30 wt % solids to form a deep maroon heterogeneous mixture. The reactor was transferred to an OptiMax Synthesis Workstation and sealed under an atmosphere of nitrogen gas. To the reactor top were affixed a stirring rod with a 4-paddle stirrer (elevated to 1 cm from the reactor bottom), a water-cooled reflux condenser, an internal thermocouple (placed at the median depth of the mixture, radially disposed halfway between the stirring shaft and the reactor wall), and a 1 cm baffle (placed perpendicular and adjacent to the outer wall of the reactor). The reactor was set to an internal temperature of 25° C. and stirring was initiated at 100 rpm to mix the heterogeneous contents. After a 30-minute equilibration period at 25° C., the reactor was warmed at a rate of 1° C./min. until reaching an internal temperature of 115 to 135° C. The reactor was maintained at target temperature for a period of 72 hours. The reactor was then cooled to 25° C. at a rate of 1° C./min. The contents of the reactor were then transferred through the outlet at the bottom of the reactor to a bottle, yielding Polymer C. [Polymer C: $M_n$=19.6 kDa; $M_w$=49.7 kDa; PDI=2.53].

Synthetic Example 4

A4B2 (1 equivalent) and DEBzOH (1.01 equivalent) were added to a 1 L OptiMax reactor (glass lined, with TEFLON™ fluoropolymer drainage plug). PGMEA solvent was added in an amount to provide a solution containing 30 wt % solids to form a deep maroon heterogeneous mixture. The reactor was transferred to an OptiMax Synthesis Workstation and sealed under an atmosphere of nitrogen gas. To the reactor top were affixed a stirring rod with a 4-paddle stirrer (elevated to 1 cm from the reactor bottom), a water-cooled reflux condenser, an internal thermocouple (placed at the median depth of the mixture, radially disposed halfway between the stirring shaft and the reactor wall), and a 1 cm baffle (placed perpendicular and adjacent to the outer wall of the reactor). The reactor was set to an internal temperature of 25° C. and stirring was initiated at 100 rpm to mix the heterogeneous contents. After a 30-minute equilibration period at 25° C., the reactor was warmed at a rate of 1° C./min. until reaching an internal temperature of 115° C. The reactor temperature was maintained at target temperature for a period of 18 hours. The reactor was then cooled from 115° C. to 25° C. at a rate of 1° C./min. The contents of the reactor were then transferred through the outlet at the bottom of the reactor to a bottle, yielding Polymer D. [Polymer D: $M_n$=22.0 kDa; $M_w$=70.0 kDa; PDI=3.18].

Synthetic Example 5

Scheme 1

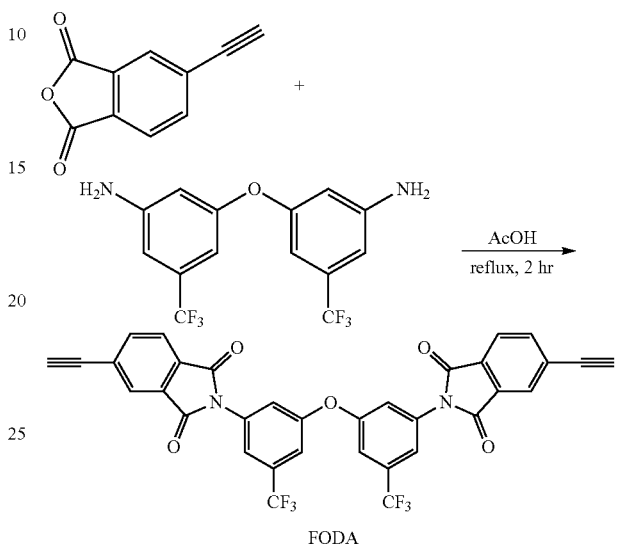

FODA 4-ethynylphthalic anhydride (2.1 eq) and 5,5'-oxybis(3-(trifluoromethyl)aniline) (1 eq) were combined in magnetically stirred acetic acid (0.2 M relative to 5,5'-oxybis(3-(trifluoromethyl)aniline)) in a round-bottom flask fitted with a Claisen adapter. The Claisen adapter was fitted with a dry ice-cooled condensation trap with a positive pressure of nitrogen applied to the inlet at the top of the condenser, and a thermometer adapter with thermocouple extending into the stirred reaction mixture. The reaction mixture was next heated to reflux (118° C.) and held at reflux for two hours. The reaction mixture was cooled to room temperature, transferred to a separatory funnel and slowly dripped into room temperature deionized water. A solid precipitate was vacuum filtered from the suspension mixture and resuspended in deionized water and stirred for 30 minutes. The suspension was vacuum filtered, and the resulting solid was suspended, washed again with stirring for 30 minutes and vacuum filtered, yielding 2,2'-(oxybis(5-(trifluoromethyl)-3,1-phenylene))bis(5-ethynylisoindoline-1,3-dione) (FODA) (96.71% yield). The cake-like solid was dried in an 80° C. vacuum oven for 48 hours to remove water and residual acetic acid. Product drying was monitored by ¹H-NMR which confirmed the presence of the desired product.

A4B2 (1 eq) and FODA (1.1 eq) were combined in GBL in an amount to provide a solution containing 20 wt % solids in a round-bottom flask equipped with a magnetic stir bar, Claisen adapter, dry ice-cooled condensation trap, thermometer adapter and thermocouple as described above. The reaction mixture was next heated to 150° C. under nitrogen atmosphere and maintained at 150° C. for 6 hours, cooled to room temperature and diluted with high purity acetone. The diluted polymer solution was transferred into a separatory funnel and then slowly added dropwise into mechanically stirred, room temperature deionized water. The solid precipitated polymer was vacuum filtered from the suspension mixture and resuspended in deionized water and stirred for 30 minutes. The suspension was vacuum filtered, the solid was suspended and washed again with stirring for 30 minutes and was again vacuum filtered to yield an off-white solid powder. The cake-like solid was dried in a vacuum oven at 80° C. for 48 hours to remove water to yield Polymer E. [Polymer E: $M_n$=13.7 kDa; $M_w$=37 kDa; PDI=2.7].

Sensing Polymer Composition Preparation

Sensing polymer compositions were prepared by combining the polymer compositions and solvents in the weight percentages set forth in Table 1 in 20 mL scintillation vials. The mixtures were agitated until a solution formed.

TABLE 1

| Example | Sensing Polymer Composition | Polymer Composition | Solvent | Polymer content (wt %) |
|---|---|---|---|---|
| 1 | SC-1 | Synthetic Ex. 1 (Polymer A) | PGMEA | 5 |
| 2 | SC-2 | Synthetic Ex. 2 (Polymer B) | Anisole | 5 |
| 3 | SC-3 | Synthetic Ex. 3 (Polymer C) | Anisole | 10 |
| 4 | SC-4 | Synthetic Ex. 4 (Polymer D) | PGMEA | 5 |

TABLE 1-continued

| Example | Sensing Polymer Composition | Polymer Composition | Solvent | Polymer content (wt %) |
|---|---|---|---|---|
| 5 | SC-5 | Synthetic Ex. 5 (Polymer E) | PGMEA | 5 |
| 6 | SC-6 | (Polymer F) | PGMEA | 5 |

Sensor Preparation

QCM Gas sensors were prepared by spin-coating sensing polymer compositions on a respective 1-inch quartz crystal with Cr/Au electrode (Stanford Research Systems O100RX1) as specified in Table 2 at 1500 rpm for 30 seconds on a Laurell WS-650MZ-8NPPB spin-coater. The sensing polymer layers were cured at the conditions set forth in Table 2 using a hotplate in the case of an air ambient and a Palomar Technologies SST 1200 Table Top Furnace in the case of a nitrogen ambient.

Analyte Sensing Procedure

A respective polymeric film-coated QCM component prepared as described above was placed in a crystal holder and disposed in a 7 L Pyrex testing chamber of the QCM system at a depth of 4 inches from the top. A pre-dose baseline resonant frequency $f_{pd}$ (reference A in FIG. 5) was established and the testing chamber was dosed with 1 μL of a liquid-phase toluene (26 ppm). The analyte was agitated by a magnetic stirrer to disperse and diffuse the liquid through the chamber in the vapor phase. The QCM was allowed to respond to the dosage via resonant frequency shift from the pre-dose baseline resonant frequency until reaching full-response resonant frequency (reference B in FIG. 5). The testing chamber was vented to atmosphere and the resonant frequency of the sensor was allowed to recover until the earlier of reaching a constant post-dose baseline frequency (reference C in FIG. 5) or 90 minutes. Sensitivity was determined as pre-dose baseline resonant frequency minus full-response resonant frequency, and response time ($t_{resp}$) was determined as the time to reach 95% of full sensitivity response. The sensors were evaluated on the day the films were prepared and after aging for seven days. The results are provided in Table 2.

TABLE 2

| Ex. | Sensing Polymer Comp. | Cure Temp/Time (° C./min) | Cure Ambient | Film Thickness (nm) | Sensitivity Day 0 (Hz) | $t_{resp}$ Day 0 (min) | Sensitivity Day 7 (Hz) | $t_{resp}$ Day 7 (min) |
|---|---|---|---|---|---|---|---|---|
| 7 | SC-1 | 350/60 | air | 170 | 16.509 | 520 | 11.069 | 1430 |
| 8 | SC-1 | 350/60 | $N_2$ | 170 | 35.040 | 280 | 17.115 | 410 |
| 9 | SC-2 | 350/60 | air | 350 | 22.076 | 480 | 9.431 | 1070 |
| 10 | SC-2 | 350/60 | $N_2$ | 350 | 35.893 | 1420 | 16.294 | 1220 |
| 11 | SC-3 | 350/60 | air | 800 | 247.996 | 300 | 17.245 | 2670 |
| 12 | SC-3 | 350/60 | $N_2$ | 800 | 162.213 | 320 | 138.320 | 2730 |
| 13 | SC-3 | 325/60 | air | 350 | 101.229 | 140 | 42.329 | 340 |
| 14 | SC-3 | 325/60 | $N_2$ | 350 | 111.989 | 290 | 87.048 | 1980 |
| 15 | SC-3 | 300/60 | air | 800 | 123.983 | 280 | 35.057 | 210 |
| 16 | SC-3 | 300/60 | $N_2$ | 800 | 78.656 | 710 | 62.452 | 1010 |
| 17 | SC-3 | 275/5 | air | 350 | 42.419 | 170 | 29.942 | 210 |
| 18 | SC-3 | 350/240 | $N_2$ | 860 | 338.153 | 420 | 258.154 | 510 |
| 19 | SC-4 | 350/60 | air | 130 | 12.500 | 30 | 1.612 | 1370 |
| 20 | SC-4 | 350/60 | $N_2$ | 130 | 41.570 | 230 | 9.195 | 1210 |
| 21 | SC-5 | 350/60 | air | nmd | 7.615 | 250 | 1.347 | 1010 |
| 22 | SC-5 | 350/60 | $N_2$ | nmd | 26.371 | 570 | 15.776 | 740 |
| 23 | SC-6 | 350/60 | air | nmd | 5.606 | 250 | 2.356 | 680 |
| 24 | SC-6 | 350/60 | $N_2$ | nmd | 34.815 | 600 | 9.760 | 1320 | nmd = no measurement data (film thickness not measured for sample); $t_{resp}$ = Response Time.

Fourier Transform Infrared (FTIR) Spectroscopy Characterization

FTIR spectroscopy of thin films on diced (1 inch×1 inch) silicon wafers were taken using a Thermo Scientific Nicolet iS5 instrument fitted with a Harrick Scientific Brewster angle set up. All baselines were taken of unmodified bare silicon wafers cut from the same wafer as the polymer-functionalized wafers. The spectra were recorded between 4000 and 400 $cm^{-1}$. The total peak area (peak integrals) from 1480 to 1522 $cm^1$ and total peak area from 1648 to 1690 $cm^{-1}$ were determined. The ratios of the latter peak area to the former peak area for the samples were determined and are set forth in Table 3.

Raman Spectroscopy Characterization

Raman spectroscopy measurements were made using a Horiba LabRam HR Raman microscope using 633 nm excitation with 300 gr/mm grating. Measurements were made using a 100× objective (Olympus Mplan-100×, NA 0.9). The total peak area (peak integrals) from 2190 to 2250 cm$^{-1}$ and total peak area from 1550 to 1650 cm$^{-1}$ were determined. The ratios of the former peak area to the latter peak area for the samples were determined and are set forth in Table 3.

TABLE 3

| Example | Sensing Polymer Comp. | Cure Temp/Time (° C./min) | Cure Ambient | *FTIR Peak Area Ratio | **Raman Peak Area Ratio |
|---|---|---|---|---|---|
| 25 | SC-1 | 350/60 | air | 0.108 | NMP |
| 26 | SC-1 | 350/60 | N$_2$ | 0.420 | NMP |
| 27 | SC-2 | 350/60 | air | 0 | NMP |
| 28 | SC-2 | 350/60 | N$_2$ | 0 | NMP |
| 29 | SC-3 | 350/60 | Air | 1.124 | NMF |
| 30 | SC-3 | 350/60 | N$_2$ | 0.086 | 0.654 |
| 31 | SC-3 | 325/60 | Air | 0.625 | 0.661 |
| 32 | SC-3 | 325/60 | N$_2$ | 0.051 | 0.978 |
| 33 | SC-3 | 300/60 | Air | 0.125 | 1.072 |
| 34 | SC-3 | 300/60 | N$_2$ | 0.052 | 1.073 |
| 35 | SC-3 | 250/60 | Air | 0.063 | 1.142 |
| 36 | SC-3 | 250/60 | N$_2$ | 0.064 | 1.134 |
| 37 | SC-4 | 350/60 | air | 1.408 | NMF |
| 38 | SC-4 | 350/60 | N$_2$ | 0.142 | 0.592 |
| 39 | SC-5 | 350/60 | air | 0.954 | NMF |
| 40 | SC-5 | 350/60 | N$_2$ | 0.097 | 0.563 |
| 41 | SC-6 | 350/60 | air | 0.484 | NMF |
| 42 | SC-6 | 350/60 | N$_2$ | 0.078 | 0.488 |

* = ratio of total FTIR peak area (peak integrals) at 1648-1690 cm$^{-1}$ to total peak area at 1480-1522 cm$^{-1}$;
** = ratio of total Raman peak area at 2190-2250 cm$^{-1}$ to total peak area at 1550-1650 cm$^{-1}$; NMP measured as no functional groups have peaks in the measured ranges; NMF = not measurable due to fluorescence effects; nmd = no measurement data made for sample.

What is claimed is:

1. A gas sensor, comprising:
a substrate;
a plurality of electrodes on the substrate; and
a polymeric sensing layer on the substrate for adsorbing a gas-phase analyte, the adsorption of which analyte is effective to change a property of the gas sensor that results in a change in an output signal from the gas sensor, wherein the polymeric sensing layer comprises a polymer chosen from substituted or unsubstituted polyarylenes comprising the reaction product of monomers comprising a first monomer comprising an aromatic acetylene group and a second monomer comprising two or more cyclopentadienone groups, or a cured product of the reaction product, wherein the first monomer is chosen from monomers of formula (1) or formula (2):

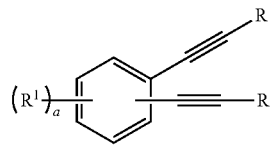

(1)

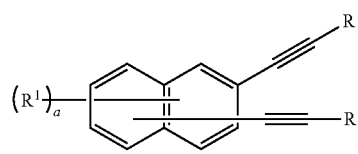

(2)

wherein: R is independently chosen from H, —C(=O)OR$^2$, substituted or unsubstituted C$_{6-20}$ aryl, or substituted or unsubstituted C$_{4-20}$ heteroaryl; R$^1$ is independently chosen from F, substituted or unsubstituted C$_{1-10}$ alkyl, substituted or unsubstituted C$_{6-20}$ aryl, C$_{4-20}$ heteroaryl, —C≡C—R, —C(=O)OR$^2$, —C(=O)NHR$^3$, —O—C(=O)R$^4$, —NHC(=O)R$^5$, —S(=O)$_2$—OR$^6$, or S(=O)$_2$—NHR$^3$; R$^2$ is independently chosen from H, substituted or unsubstituted C$_{1-10}$ alkyl, C$_{6-20}$ aryl, or C$_{4-20}$ heteroaryl; R$^3$ is independently chosen from H or substituted or unsubstituted C$_{1-10}$ alkyl; R$^4$ is independently chosen from H or substituted or unsubstituted C$_{1-10}$ alkyl; R$^5$ is independently chosen from H or substituted or unsubstituted C$_{1-10}$ alkyl; R$^6$ is independently chosen from H or substituted or unsubstituted C$_{1-10}$ alkyl; and a in formula (1) is an integer from 0 to 2, and a in formula (2) is an integer from 0 to 3; and the second monomer is of formula (3A):

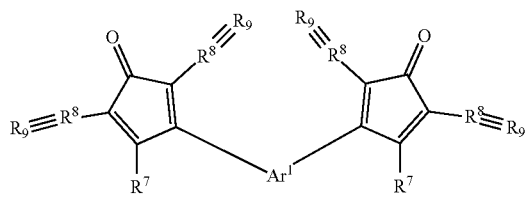

(3A)

wherein each R$^7$ is independently chosen from H, substituted or unsubstituted C$_{1-6}$ alkyl, substituted or unsubstituted C$_{6-20}$ aryl, or substituted or unsubstituted C$_{4-20}$ heteroaryl; R$^8$ is substituted or unsubstituted C$_{6-20}$ aryl, or substituted or unsubstituted C$_{4-20}$ heteroaryl; R$^9$ is independently chosen from substituted or unsubstituted C$_{1-6}$ alkyl, substituted or unsubstituted C$_{6-20}$ aryl, or substituted or unsubstituted C$_{4-20}$ heteroaryl; and Ar$^1$ is an aromatic moiety.

2. The gas sensor of claim 1, wherein the polymer exhibits an FTIR spectroscopy spectrum having a ratio of total peak area from 1648 to 1690 cm$^{-1}$ to total peak area from 1480 to 1522 cm$^{+1}$ of 0.15 or less.

3. The gas sensor of claim 2, wherein the polymeric sensing layer exhibits a Raman spectroscopy spectrum having a ratio of total peak area from 2190 to 2250 cm$^{-1}$ to total peak area from 1550 to 1650 cm$^{-1}$ of 1.0 or less.

4. The gas sensor of claim 1, wherein the polymeric sensing layer has an oxygen content of 7 atomic % or less as measured by x-ray photoelectron spectroscopy.

5. The gas sensor of claim 1, wherein the polymeric sensing layer is formed by a process comprising coating a composition comprising the first monomer, the second monomer and a solvent, and curing the coated composition at a temperature of from 300 to 400° in an inert gas atmosphere.

6. The gas sensor of claim 1, wherein the gas sensor is an acoustic wave, capacitive, or conductometric gas sensor.

7. The gas sensor of claim 6, wherein the gas sensor is an acoustic wave gas sensor.

8. A method of sensing a gas-phase analyte, comprising:
(a) providing a gas sensor, comprising:
a substrate;
a plurality of electrodes on the substrate; and
a polymeric sensing layer on the substrate for adsorbing a gas-phase analyte, the adsorption of which analyte is effective to change a property of the gas sensor that results in a change in an output signal from the gas sensor, wherein the polymeric sensing layer comprises a polymer chosen from substituted or unsubstituted polyarylenes comprising the reaction product of monomers comprising a first monomer comprising an aromatic acetylene group and a second monomer comprising two or more cyclopentadienone groups, or a cured product of the reaction product, wherein the first monomer is chosen from monomers of formula (1) or formula (2):

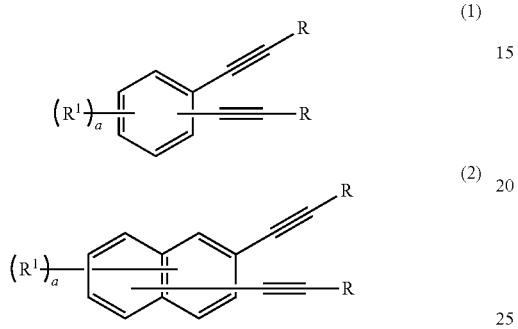

wherein: R is independently chosen from H, —C(=O)OR$^2$, substituted or unsubstituted C$_{6-20}$ aryl, or substituted or unsubstituted C$_{4-20}$ heteroaryl; R$^1$ is independently chosen from F, substituted or unsubstituted C$_{1-10}$ alkyl, substituted or unsubstituted C$_{6-20}$ aryl, C$_{4-20}$ heteroaryl, —C≡C—R, —C(=O)OR$^2$, —C(=O)NHR$^3$, —O—C(=O)R$^4$, —NHC(=O)R$^5$, —S(=O)$_2$—OR$^6$, or S(=O)$_2$—NHR$^3$; R$^2$ is independently chosen from H, substituted or unsubstituted C$_{1-10}$ alkyl, C$_{6-20}$ aryl, or C$_{4-20}$ heteroaryl; R$^3$ is independently chosen from H or substituted or unsubstituted C$_{1-10}$ alkyl; R$^4$ is independently chosen from H or substituted or unsubstituted C$_{1-10}$ alkyl; R$^5$ is independently chosen from H or substituted or unsubstituted C$_{1-10}$ alkyl; R$^6$ is independently chosen from H or substituted or unsubstituted C$_{1-10}$ alkyl; and a in formula (1) is an integer from 0 to 2, and a in formula (2) is an integer from 0 to 3, and wherein the second monomer is of formula (3A):

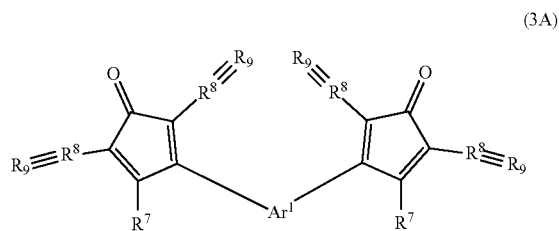

wherein each R$^7$ is independently chosen from H, substituted or unsubstituted C$_{1-6}$ alkyl, substituted or unsubstituted C$_{6-20}$ aryl, or substituted or unsubstituted C$_{4-20}$ heteroaryl; R$^8$ is substituted or unsubstituted C$_{6-20}$ aryl, or substituted or unsubstituted C$_{4-20}$ heteroaryl; R$^9$ is independently chosen from substituted or unsubstituted C$_{1-6}$ alkyl, substituted or unsubstituted C$_{6-20}$ aryl, or substituted or unsubstituted C$_{4-20}$ heteroaryl; and Ar$^1$ is an aromatic moiety; and (b) exposing the polymeric sensing layer to an atmosphere comprising a gas-phase analyte.

9. The method of claim 8, wherein adsorption of the gas-phase analyte is effective to change a property of the gas sensor that results in a change in an output signal from the gas sensor.

10. The method of claim 9, further comprising, in sequence:
(c) exposing the sensor to a second atmosphere effective to reduce the content of the gas-phase analyte in the sensor;
(d) allowing the resonant frequency of the acoustic wave sensor to recover to a baseline frequency; and
(e) exposing the sensor to a third atmosphere comprising a gas-phase analyte;
wherein the step (d), (e), and (f) sequence is performed one or more times.

11. The method of claim 8, wherein the gas-phase analyte is an organic material.

12. The method of claim 11, wherein the gas-phase analyte is chosen from one or more of benzene, toluene, xylene, mesitylene, ethanol, formaldehyde, acetaldehyde, acetone, acetic acid, or a trialkylamine.

13. The method of claim 8, wherein the gas-phase analyte is an inorganic material.

* * * * *